United States Patent
Dikshit

(10) Patent No.: US 10,931,958 B2
(45) Date of Patent: Feb. 23, 2021

(54) JPEG ACCELERATOR USING LAST-NON-ZERO (LNZ) SYNTAX ELEMENT

(71) Applicant: Fungible, Inc., Santa Clara, CA (US)

(72) Inventor: Abhishek Kumar Dikshit, Fremont, CA (US)

(73) Assignee: Fungible, Inc., Santa Clara, CA (US)

( * ) Notice: Subject to any disclaimer, the term of this patent is extended or adjusted under 35 U.S.C. 154(b) by 120 days.

(21) Appl. No.: 16/179,558

(22) Filed: Nov. 2, 2018

(65) Prior Publication Data

US 2020/0145683 A1    May 7, 2020

(51) Int. Cl.

| | |
|---|---|
| G06K 9/46 | (2006.01) |
| H04N 19/436 | (2014.01) |
| H04N 19/70 | (2014.01) |
| H04N 19/14 | (2014.01) |
| H04N 19/129 | (2014.01) |
| H04N 19/176 | (2014.01) |

(52) U.S. Cl.
CPC ......... *H04N 19/436* (2014.11); *H04N 19/129* (2014.11); *H04N 19/14* (2014.11); *H04N 19/176* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 8,531,468 B1 | 9/2013 | Joshi et al. | |
| 8,766,827 B1 | 7/2014 | Milne et al. | |
| 9,319,692 B2 | 4/2016 | Henry et al. | |
| 9,319,693 B2 | 4/2016 | Henry et al. | |
| 9,591,320 B2 | 3/2017 | Budagavi et al. | |
| 9,712,830 B1* | 7/2017 | Horn ..................... | H04N 19/176 |
| 10,158,890 B2 | 12/2018 | Choi et al. | |
| 2006/0013493 A1 | 1/2006 | Yang et al. | |
| 2006/0269147 A1 | 11/2006 | Shen et al. | |
| 2010/0305449 A1* | 12/2010 | Wegener ............. | G01S 7/52034 600/459 |
| 2011/0243226 A1 | 10/2011 | Choi et al. | |
| 2012/0014457 A1* | 1/2012 | He ........................ | H04N 19/136 375/240.25 |

(Continued)

FOREIGN PATENT DOCUMENTS

| | | |
|---|---|---|
| EP | 2013/070707 A1 | 5/2013 |
| EP | 3061233 A1 | 8/2016 |

OTHER PUBLICATIONS

Wu et al., "Lossless Compression of JPEG Coded Photo Collections," IEEE Transactions on Image Processing, vol. 25, No. 6, Jun. 2016, pp. 2684-2696.

(Continued)

*Primary Examiner* — Randolph I Chu
(74) *Attorney, Agent, or Firm* — Shumaker & Sieffert, P.A.

(57) ABSTRACT

A device includes a memory configured to store image data and an image coding unit. The image coding unit is configured to determine an indication of a last-non-zero (LNZ) syntax element for a block of image data and determine contexts for coding a coefficient map value for each coefficient of a plurality of coefficients of the block using the LNZ syntax element. The image coding unit is further configured to context-based code the coefficient map value for each of the plurality of coefficients in parallel using the respective contexts.

27 Claims, 20 Drawing Sheets

| COEFFICIENT | 1 | 2 | 3 | 4 | 5 | 6 | 7 | 8 | 9 | 10 | 11 | 12 |
|---|---|---|---|---|---|---|---|---|---|---|---|---|
| COEFFICIENT MAP (752) | 1 | 1 | 0 | 1 | 0 | 1 | 1 | 0 | 1 | 0 | 0 | 1 |
| NNZ (754) | 6 | 5 | 5 | 4 | 4 | 3 | 2 | 2 | 1 | 1 | 1 | 0 |

(750)

(56) References Cited

U.S. PATENT DOCUMENTS

| | | | |
|---|---|---|---|
| 2012/0020408 A1* | 1/2012 | Chen | H04N 19/134 |
| | | | 375/240.03 |
| 2012/0128064 A1 | 5/2012 | Sato | |
| 2012/0262313 A1* | 10/2012 | He | H03M 7/3079 |
| | | | 341/87 |
| 2013/0003821 A1 | 1/2013 | Karczewicz et al. | |
| 2013/0279577 A1 | 10/2013 | Schwarz et al. | |
| 2013/0279806 A1 | 10/2013 | Tonisson et al. | |
| 2014/0064365 A1 | 3/2014 | Wang et al. | |
| 2014/0133581 A1 | 5/2014 | Naito | |
| 2014/0294073 A1 | 10/2014 | Park et al. | |
| 2014/0362925 A1 | 12/2014 | Nguyen et al. | |
| 2015/0227557 A1 | 8/2015 | Holzschneider et al. | |
| 2016/0234520 A1* | 8/2016 | Goel | H04N 19/70 |
| 2017/0280144 A1* | 9/2017 | Dvir | H04N 7/174 |
| 2018/0146199 A1 | 5/2018 | Horn et al. | |
| 2018/0287965 A1 | 10/2018 | Sindhu et al. | |
| 2018/0293168 A1 | 10/2018 | Noureddine | |
| 2019/0012278 A1 | 1/2019 | Sindhu et al. | |
| 2019/0013965 A1 | 1/2019 | Sindhu et al. | |
| 2019/0068981 A1 | 2/2019 | Chong et al. | |
| 2019/0158428 A1 | 5/2019 | Gray et al. | |
| 2019/0243765 A1 | 8/2019 | Noureddine | |

OTHER PUBLICATIONS

Sullivan et al., "Overview of the High Efficiency Video Coding (HEVC) Standard," IEEE Transactions on Circuits and Systems for Video Technology, vol. 22, No. 12, Dec. 2012, pp. 1649-1668.
U.S. Appl. No. 16/179,472, filed Nov. 2, 2018, by Dikshit et al.
U.S. Appl. No. 16/179,496, filed Nov. 2, 2018, by Dikshit et al.
U.S. Appl. No. 16/179,529, filed Nov. 2, 2018, by Dikshit et al.
Sole et al., "Parallel Context Processing for the Significance Map in High Coding Efficiency," Joint Collaborative Team on Video Coding (JCT-VC), Document: JCTVC-D262, Jan. 11, 2011, 4 pp.
International Search Report and Written Opinion of International Application No. PCT/US2019/059203, dated May 29, 2020, 24 pp.
Invitation to Pay Additional Fees and,Where Applicable, Protest Fee Application No. PCT/US2019/059203, dated Feb. 7, 2020, 16 pp.

\* cited by examiner

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

70

DC COEFFICIENT

AC LOW COEFFICIENT VALUES

AC HIGH COEFFICIENT VALUES

| COEFFICIENT | 1 | 2 | 3 | 4 | 5 | 6 | 7 | 8 | 9 | 10 | 11 | 12 |
|---|---|---|---|---|---|---|---|---|---|---|---|---|
| COEFFICIENT MAP | 1 | 1 | 0 | 1 | 0 | 1 | 1 | 0 | 1 | 0 | 0 | 1 |
| NNZ | 6 | 5 | 5 | 4 | 4 | 3 | 2 | 2 | 1 | 1 | 1 | 0 |

JPEG ACCELERATOR USING LAST-NON-ZERO (LNZ) SYNTAX ELEMENT

TECHNICAL FIELD

The disclosure relates to processing packets of information, for example, in the fields of networking and storage.

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage/compute servers, firewalls, intrusion detection devices, switches, routers or other network attached devices, often use general purpose processors, including multi-core processing systems, to process data, such as network or storage data. However, general purpose processing cores and multi-processing systems are normally not designed for high-capacity network and storage workloads of modern networks and can be relatively poor at performing packet stream processing.

SUMMARY

In general, this disclosure describes a highly programmable device, referred to generally as a data processing unit, having multiple processing units for processing streams of information, such as network packets or storage packets. In some examples, the processing units may be processing cores, and in other examples, the processing units may be virtual processors, hardware threads, hardware blocks, or other sub-processing core units. As described herein, the data processing unit includes one or more specialized hardware-based accelerators configured to perform acceleration for various data-processing functions, thereby offloading tasks from the processing units.

In various examples, this disclosure describes a programmable, hardware-based accelerator configured to store and retrieve images, such as Joint Picture Experts Group (JPEG) images. The accelerator may, for example, be a hardware implementation of a JPEG accelerator as a component of the data processing unit (DPU) integrated circuit. The JPEG accelerator may be configured to code a first block and, in parallel, context-based code a second block using context of the first block. For example, the JPEG accelerator may decode a syntax element for a first block of image data. In this example, the JPEG accelerator may context-based decode a syntax element of the second block of the image data and, in parallel, decode another syntax element of a second block of the image data.

In an example, a device includes a memory configured to store image data and an image coding unit implemented in circuitry. The image coding unit is configured to code a first value of a first instance of a first syntax element of a first block of image data and determine a first context for coding a second value of a second instance of the first syntax element of a second block of the image data. The image coding unit is further configured to context-based code the second value of the second instance of the first syntax element of the second block of the image data after coding the first value of the first instance of the first syntax element using the first context and code a third value of a first instance of a second syntax element of the first block in parallel with coding the second value or after coding the second value.

In another example, a method includes coding, by an image coding unit implemented in circuitry of a device, a first value of a first instance of a first syntax element of a first block of image data, determining, by the image coding unit, a first context for coding a second value of a second instance of the first syntax element of a second block of the image data, context-based coding, by the image coding unit, the second value of the second instance of the first syntax element of the second block of the image data after coding the first value of the first instance of the first syntax element using the first context, and coding, by the image coding unit, a third value of a first instance of a second syntax element of the first block in parallel with coding the second value or after coding the second value.

In another example, a computer-readable storage medium comprising instructions that, when executed, cause a processor to code a first value of a first instance of a first syntax element of a first block of image data, determine a first context for coding a second value of a second instance of the first syntax element of a second block of the image data, context-based code the second value of the second instance of the first syntax element of the second block of the image data after coding the first value of the first instance of the first syntax element using the first context, and code a third value of a first instance of a second syntax element of the first block in parallel with coding the second value or after coding the second value.

In another example, a method includes storing, by an image coding unit implemented in circuitry of a device, a first portion of a set of context information in memory of the image coding unit as an array representing a direct access table, storing, by the image coding unit, a second portion of the set of context information in a hash table, determining, by the image coding unit, whether a context value for context-based coding of a value of an instance of a syntax element for a block of image data is stored in the array or in the hash table, retrieving, by the image coding unit, the context value from either the array or the hash table according to the determination, and context-based coding the value of the instance of the syntax element using the context value.

In another example, a device includes a memory configured to store image data and an image coding unit implemented in circuitry. The image coding unit is configured to store a first portion of a set of context information in memory of the image coding unit as an array representing a direct access table, store a second portion of the set of context information in a hash table, determine whether a context value for context-based coding of a value of an instance of a syntax element for a block of image data is stored in the array or in the hash table, retrieve the context value from either the array or the hash table according to the determination, and context-based code the value of the instance of the syntax element using the context value.

In another example, a computer-readable storage medium comprising instructions that, when executed, cause a processor to store a first portion of a set of context information in memory of the image coding unit as an array representing a direct access table, store a second portion of the set of context information in a hash table, determine whether a context value for context-based coding of a value of an instance of a syntax element for a block of image data is stored in the array or in the hash table, retrieve the context value from either the array or the hash table according to the determination, and context-based code the value of the instance of the syntax element using the context value.

In another example, a method includes decoding, by an image coding unit implemented in circuitry of a device, a first set of one or more bits of a first value of a first instance of a first syntax element of a block of image data, determining, by the image coding unit, that the first set of one or more bits have values indicating that one or more values of respective instances of one or more other syntax elements of the block of image data are to be decoded, and in response to the determination, decoding, by the image coding unit, one or more bits of the one or more values of the respective instances of the one or more other syntax elements of the block prior to decoding a second set of one or more bits of the first value of the first instance of the first syntax element.

In another example, a device includes a memory configured to store image data and an image coding unit implemented in circuitry. The image coding unit is configured to decode a first set of one or more bits of a first value of a first instance of a first syntax element of a block of image data, determine that the first set of one or more bits have values indicating that one or more values of respective instances of one or more other syntax elements of the block of image data are to be decoded, and in response to the determination, decode one or more bits of the one or more values of the respective instances of the one or more other syntax elements of the block prior to decoding a second set of one or more bits of the first value of the first instance of the first syntax element.

In another example, a computer-readable storage medium comprising instructions that, when executed, cause a processor to decode a first set of one or more bits of a first value of a first instance of a first syntax element of a block of image data, determine that the first set of one or more bits have values indicating that one or more values of respective instances of one or more other syntax elements of the block of image data are to be decoded, and in response to the determination, decode one or more bits of the one or more values of the respective instances of the one or more other syntax elements of the block prior to decoding a second set of one or more bits of the first value of the first instance of the first syntax element.

In another example, a method includes determining, by an image coding unit implemented in circuitry of a device, an indication of a last-non-zero (LNZ) syntax element for a block of image data and determining, by the image coding unit, contexts for coding coefficient map values for each coefficient of a plurality of coefficients of the block using the LNZ syntax element. The method further includes context-based coding, by the image coding unit, the coefficient map values for each of the plurality of coefficients in parallel using the respective contexts.

In another example, a device includes a memory configured to store image data and an image coding unit implemented in circuitry. The image coding unit is configured to determine an indication of a last-non-zero (LNZ) syntax element for a block of image data and determine contexts for coding coefficient map values for each coefficient of a plurality of coefficients of the block using the LNZ syntax element. The image coding unit is further configured to context-based code the coefficient map values for each of the plurality of coefficients in parallel using the respective contexts.

In another example, a computer-readable storage medium comprising instructions that, when executed, cause a processor to determine an indication of a last-non-zero (LNZ) syntax element for a block of image data, determine contexts for coding coefficient map values for each coefficient of a plurality of coefficients of the block using the LNZ syntax element, and context-based code the coefficient map values for each of the plurality of coefficients in parallel using the respective contexts.

The details of one or more examples are set forth in the accompanying drawings and the description below. Other features, objects, and advantages will be apparent from the description and drawings, and from the claims.

DETAILED DESCRIPTION

Figure 1:
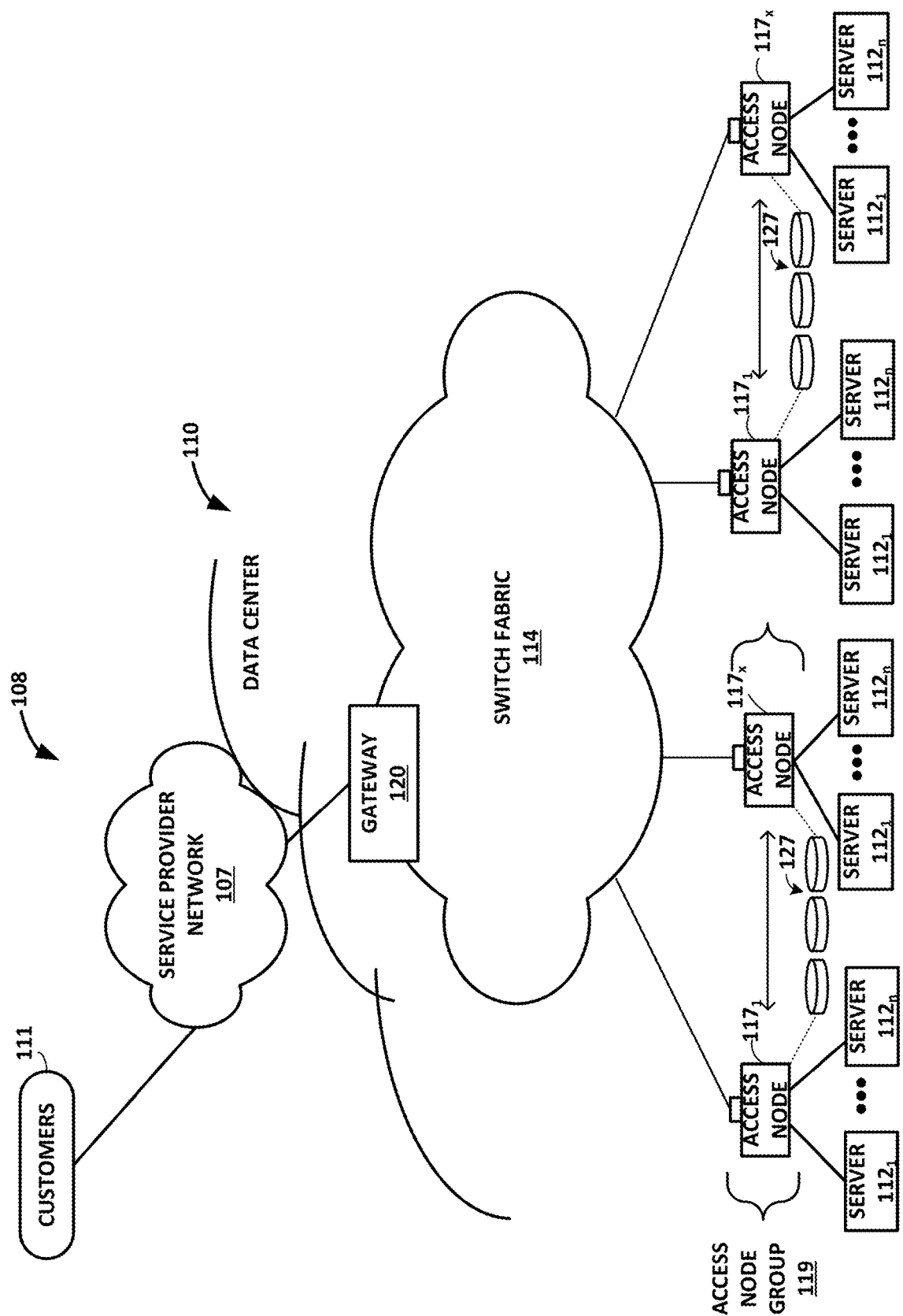
FIG. 1 is a block diagram illustrating an example system including one or more network devices configured to efficiently process a series of work units in a multiple core processor system.

FIG. 1 is a block diagram illustrating an example system 108 including one or more network devices configured to efficiently process a series of work units in a multiple core processor system. As described herein, techniques for parallel coding of syntax elements for an image may provide technical benefits that include improving the efficiency and utilization of processing cores within access nodes 117 in FIG. 1. Access nodes may also be referred to as data processing units (DPUs), or devices including DPUs, in this disclosure. In the example of FIG. 1, various data structures and processing techniques are described with respect to access nodes 117 within a data center 110. Other devices within a network, such as routers, switches, servers, firewalls, gateways and the like, having multiple core processor systems may readily be configured to utilize the data processing techniques described herein.

Data center 110 represents an example of a system in which various techniques described herein may be implemented. In general, data center 110 provides an operating environment for applications and services for customers 111 coupled to the data center by service provider network 107 and gateway device 120. Data center 110 may, for example, host infrastructure equipment, such as compute nodes, networking and storage systems, redundant power supplies, and environmental controls. Service provider network 107 may be coupled to one or more networks administered by other providers, and may thus form part of a large-scale public network infrastructure, e.g., the Internet. In other examples, content/service provider network 107 may be a data center wide-area network (DC WAN), private network or other type of network.

In some examples, data center 110 may represent one of many geographically distributed network data centers. In the example of FIG. 1, data center 110 is a facility that provides information services for customers 111. Customers 111 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 110 includes a set of storage systems and application servers 112 interconnected via a high-speed switch fabric 114. In some examples, servers 112 are arranged into multiple different server groups, each including any number of servers up to, for example, n servers $112_1$-$112_n$. Servers 112 provide computation and storage facilities for applications and data associated with customers 111 and may be physical (bare-metal) servers, virtual machines running on physical servers, virtualized containers running on physical servers, or combinations thereof.

In the example of FIG. 1, each of servers 112 is coupled to switch fabric 114 by an access node 117 for processing streams of information, such as network packets or storage packets. In example implementations, access nodes 117 may be configurable to operate in a standalone network appliance having one or more access nodes. For example, access nodes 117 may be arranged into multiple different access node groups 119, each including any number of access nodes up to, for example, x access nodes $117_1$-$117_x$. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 119 may be configured to operate as a high-performance I/O hub designed to aggregate and process network and/or storage I/O for multiple servers 112. As described above, the set of access nodes 117 within each of the access node groups 19 provide highly-programmable, specialized I/O processing circuits for handling networking and communications operations on behalf of servers 112. In addition, in some examples, each of access node groups 19 may include storage devices 127, such as solid state drives (SSDs) and/or hard disk drives (HDDs), configured to provide network accessible storage for use by applications executing on the servers 112. In some examples, one or more of the SSDs may comprise non-volatile memory (NVM) or flash memory. Each access node group 119, including its set of access nodes 117 and storage devices 127, and the set of servers 112 supported by the access nodes 117 of that access node group 119 may be referred to herein as a network storage compute unit.

As further described herein, in one example, each access node 117 is a highly programmable I/O processor (referred to as a DPU) specially designed for offloading certain functions from servers 112. In one example, each access node 117 includes a number of internal processor clusters, each including two or more processing cores and equipped with hardware engines that offload cryptographic, compression and decompression, and regular expression (RegEx) processing, data storage functions, and networking operations. In this way, each access node 117 includes components for fully implementing and processing network and storage stacks on behalf of one or more servers 112. In addition, access nodes 117 may be programmatically configured to serve as a security gateway for its respective servers 112, freeing up the processors of the servers to dedicate resources to application workloads. In some example implementations, each access node 117 may be viewed as a network interface subsystem that implements full offload of the handling of data packets (with zero copy in server memory) and storage acceleration for the attached server systems. In one example, each access node 117 may be implemented as one or more application-specific integrated circuit (ASIC) or other hardware and software components, each supporting a subset of the servers. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference.

In accordance with the techniques of this disclosure, any or all of access nodes 117 may include an image compression and decompression accelerator unit, e.g., according to JPEG. That is, one or more computing devices may include an access node including one or more JPEG accelerator units, according to the techniques of this disclosure.

The JPEG accelerator unit of the access node, according to the techniques of this disclosure, may be configured to process payloads of packets for storage and retrieval services of image data in the packets as the packets are exchanged by access nodes 22, e.g., between access nodes 117 via switch fabric 114, storage devices 127, and/or servers 112. That is, when packets include data for an image file to be stored to or retrieved from servers 112 and/or storage devices 127, the JPEG accelerator unit applies the techniques of this disclosure to further compress or decompress the image data. In particular, when data of packets for an image file are stored to servers 112 or storage devices 127, the JPEG accelerator unit of one of access nodes 117 decodes and reencodes the image data to further improve storage capabilities of storage devices, e.g., storage devices within servers 112 and/or storage devices 127. Likewise, when data of packets for an image file are retrieved from servers 112 or storage devices 127, the JPEG accelerator unit removes the extra compression applied to the image file by decoding and reencoding the image file, to restore the image file to its original compressed state.

In general, the additional compression added to an image file includes rearranging data for blocks of image data within minimum coded units (MCUs) of the image file. That is, a JPEG encoded image includes blocks representing pixels of the image, where a collection of one or more blocks is referred to as an MCU. The syntax elements of the blocks represent quantized transform coefficients, which represent a transformed version of the pixel data in a transform domain. The transform coefficients generally concentrate energy for the pixel data in an upper-left corner of a two-dimensional block including the transform coefficients, where an upper-left transform coefficient is referred to as a direct current (DC) coefficient, and the remaining coefficients are referred to as alternating current (AC) coefficients.

The block includes coefficients having values of zero and non-zero, with many coefficients at a bottom-right of the block being zero valued. The coefficients are typically stored in a one-dimensional array produced by zig-zag scanning the two-dimensional block. In this manner, there may be a sequence of zero-valued coefficients at the end of the one-dimensional array, corresponding to coefficients at the lower-right corner of the block. Rather than storing values for each of these zero-valued coefficients, the MCU may include one or more syntax elements representing a position of a last non-zero (LNZ) value for the coefficients in the scan order, such that the values for the training zero-valued coefficients need not be stored.

In some examples, an MCU for a JPEG image may be coded based on one or more other MCUs. For example, the JPEG accelerator unit may code a current MCU based on data of one or more MCUs used for context. Such MCUs may be referred to as "context MCUs." Examples of a context MCU may include, but are not limited to, for example, a MCU to the left of the current MCU, a MCU above the current MCU, a MCU diagonally to the left and above the current MCU, or another MCU. In some examples, the JPEG accelerator unit may use a current pointer to specify a current MCU and a trailing pointer to specify a context MCU. In this way, the JPEG accelerator unit may be configured to code an MCU based on one or more context MCUs without relying solely on storing decoded context MCUs.

In general, arithmetic coding refers to determining a value within a range of possible values, where the determined value represents actual data to be coded. A processing unit may partition the range of possible values according to probabilities of symbols, e.g., '0' and '1', occurring. The processing unit may determine different probabilities for the symbols based on context information, that is, the context in which a symbol occurs. For example, the probability of a '0' occurring following a series of multiple '0' valued symbols may be greater than the probability of a '0' occurring following a series of multiple '1' valued symbols. Thus, references to "context coding" or "coding according to context" generally refer to determining a probability of a symbol to be coded occurring according to previously coded information, i.e., the context in which the symbol occurs. A context model may define probabilities for symbols given a sequence of previous symbols or other context information.

In the example of FIG. 1, each access node 117 provides connectivity to switch fabric 114 for a different group of servers 112 and may be assigned respective IP addresses and provide routing operations for the servers 112 coupled thereto. Access nodes 117 may interface with and utilize switch fabric 114 so as to provide full mesh (any-to-any) interconnectivity such that any of servers 112 may communicate packet data for a given packet flow to any other of the servers using any of a number of parallel data paths within the data center 110. In addition, access nodes 117 described herein may provide additional services, such as storage (e.g., integration of solid-state storage devices), security (e.g., encryption), acceleration (e.g., compression), I/O offloading, and the like. In some examples, one or more of access nodes 117 may include storage devices, such as high-speed solid-state drives or rotating hard drives, configured to provide network accessible storage for use by applications executing on the servers. More details on the example data center network architecture and interconnected access nodes illustrated in FIG. 1 are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

Two example architectures of access nodes 117 are described below with respect to FIGS. 2, 3, and 4. With respect to either example, the architecture of each access node 117 comprises a multiple core processor system that represents a high performance, hyper-converged network, storage, and data processor and input/output hub. The architecture of each access node 117 is optimized for high performance and high efficiency stream processing.

In general, a stream, also referred to as a data stream, may be viewed as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. In one example, a stream fragment may include a memory block contiguously addressable in physical address space, an offset into that block, and a valid length. Streams can be discrete, such as a sequence of packets received from a network, or continuous, such as a stream of blocks, words or bytes read from a storage device. A stream of one type may be transformed into another type as a result of processing. Independent of the stream type, stream manipulation requires efficient fragment manipulation. An application executing on one of access nodes 117 may operate on a stream in three broad ways: the first is protocol processing, which consists of operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access nodes 117 can safely access different windows within the stream.

As described herein, data processing units of access nodes 117 may process stream information by managing "work units." In general, a Work Unit (WU) is a container that is associated with a stream state and used to describe (i.e. point to) data within a stream (stored in memory) along with any associated meta-data and operations to be performed on the data. In the example of FIG. 1, streams of data units may dynamically originate within a peripheral unit of one of access nodes 117 (e.g. injected by a networking unit, a host unit, or a solid state drive interface), or within a processor of the one of access nodes 117, in association with one or more streams of data, and terminate at another peripheral unit or another processor of the one of access nodes 117. Each work unit maintained by a data processing unit is associated with an amount of work that is relevant to the entity executing the work unit for processing a respective portion of a stream.

Stream processing is typically initiated as a result of receiving one or more data units associated with respective portions of the stream and constructing and managing work units for processing respective portions of the data stream. In protocol processing, a portion would be a single buffer (e.g. packet), for example. Within access nodes 117, work units may be executed by processor cores, hardware blocks, I/O interfaces, or other computational processing units. For instance, a processor core of an access node 117 executes a work unit by accessing the respective portion of the stream from memory and performing one or more computations in accordance with the work unit. A component of the one of access nodes 117 may receive, execute or generate work units. A succession of work units may define how the access node processes a flow, and smaller flows may be stitched together to form larger flows.

For purposes of example, DPUs of or within each access node 117 may execute an operating system, such as a general-purpose operating system (e.g., Linux or other flavor of Unix) and/or a special-purpose operating system, that provides an execution environment for data plane software for data processing. Moreover, each DPU may be configured to utilize a work unit (WU) stack data structure (referred to as a 'WU stack' in a multiple core processor system. As described herein, the WU stack data structure may provide certain technical benefits, such as helping manage an event driven, run-to-completion programming model of an operating system executed by the multiple core processor system. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 117 may process WUs through a plurality of processor cores arranged as processing pipelines within access nodes 117, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core. More details on work units and stream processing by data processing units of access nodes are available in U.S. Provisional Patent Application No. 62/589,427, filed Nov. 21, 2017, entitled "Work Unit Stack Data Structures in Multiple Core Processor System," and U.S. Provisional Patent Application No. 62/625,518, entitled "EFFICIENT WORK UNIT PROCESSING IN A MULTICORE SYSTEM", filed Feb. 2, 2018, the entire contents of both being incorporated herein by reference.

As described herein, the data processing units for access nodes 117 includes one or more specialized hardware-based accelerators configured to perform acceleration for various data-processing functions, thereby offloading tasks from the processing units when processing work units. That is, each accelerator is programmable by the processing cores, and one or more accelerators may be logically chained together to operate on stream data units, such as by providing cryptographic functions, compression and regular expression (RegEx) processing, data storage functions and networking operations. This disclosure describes a programmable, hardware-based accelerator unit configured to code JPEG images. The accelerator unit may include a hardware implementation of a image coding unit. In particular, the JPEG accelerator unit may be configured to context-based code different blocks of image data in parallel with other blocks of the image data.

Figure 2:
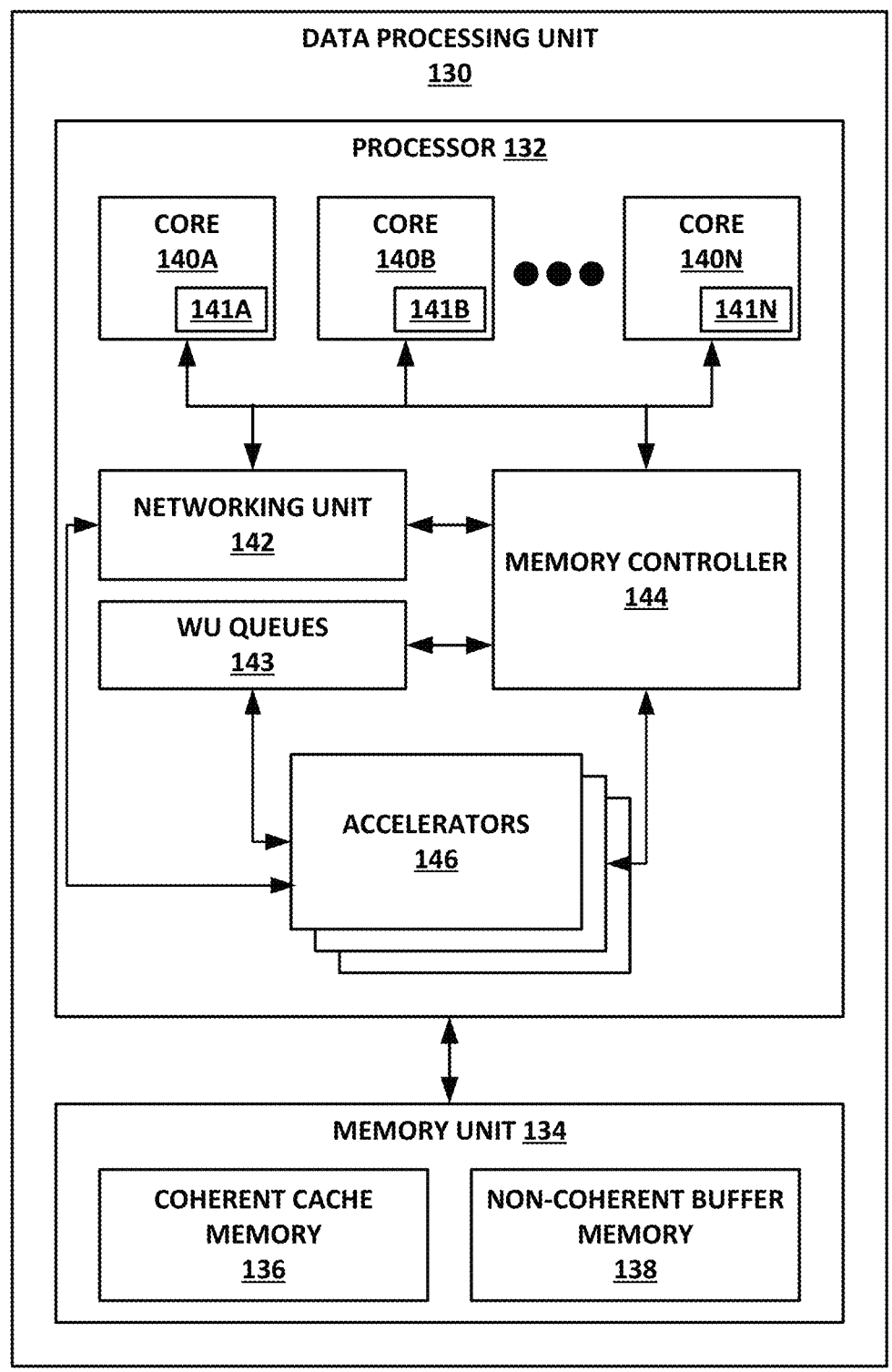
FIG. 2 is a block diagram illustrating an example data processing unit (DPU) including two or more processing cores, in accordance with the techniques of this disclosure.

FIG. 2 is a block diagram illustrating an example data processing unit (DPU) 130 including two or more processing cores, in accordance with the techniques of this disclosure. DPU 130 generally represents a hardware chip implemented in digital logic circuitry and may be used in any computing or network device. DPU 130 may operate substantially similar to and generally represent any of access nodes 117 of FIG. 1. Thus, DPU 130 may be communicatively coupled to one or more network devices, server devices (e.g., servers 112), random access memory, storage media (e.g., solid state drives (SSDs)), a data center fabric (e.g., switch fabric 114), or the like, e.g., via PCI-e, Ethernet (wired or wireless), or other such communication media. Moreover, DPU 130 may be implemented as one or more application-specific integrated circuit (ASIC), may be configurable to operate as a component of a network appliance or may be integrated with other DPUs within a device.

In the illustrated example of FIG. 2, DPU 130 includes a multi-core processor 132 having a plurality of programmable processing cores 140A-140N ("cores 140") coupled to an on-chip memory unit 134. Each of cores 140 includes a level 1 cache 141 (level 1 caches 141a, 141b, and 141n are associated with cores 140a, 140b, and 140n, respectively).

Memory unit 134 may include two types of memory or memory devices, namely coherent cache memory 136 and non-coherent buffer memory 138. Processor 132 also includes a networking unit 142, work unit (WU) queues 143, a memory controller 144, and accelerators 146. As illustrated in FIG. 2, each of cores 140, networking unit 142, WU queues 143, memory controller 144, memory unit 134, and accelerators 146 are communicatively coupled to each other. In some examples, processor 132 of DPU 130 further includes one or more accelerators (not shown) configured to perform acceleration for various data-processing functions, such as look-ups, matrix multiplication, cryptography, compression, regular expressions, or the like.

In this example, DPU 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 114 of FIG. 1. DPU 130 may also include one or more interfaces for connectivity to host devices (e.g., servers) and data storage devices, e.g., solid state drives (SSDs) via PCIe lanes. DPU 130 may further include one or more high bandwidth interfaces for connectivity to off-chip external memory.

Processor 132 further includes accelerators 146 configured to perform acceleration for various data-processing functions, such as look-ups, matrix multiplication, cryptography, compression, regular expressions, or the like. For example, accelerators 146 may comprise hardware implementations of look-up engines, matrix multipliers, cryptographic engines, compression engines, or the like. The functionality of different hardware accelerators is described is more detail below with respect to FIG. 4. In accordance with the techniques of this disclosure, at least one of accelerators 146 represents a hardware implementation of a JPEG accelerator. In particular, according to the techniques of this disclosure, accelerators 146 include at least one JPEG accelerator configured to further compress image files for storage or decompress the image files for retrieval, as discussed in greater detail below.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and U.S. patent application Ser. No. 15/949,892, filed Apr. 10, 2018, and titled "Relay Consistent Memory Management in a Multiple Processor System," the entire content of each of which is incorporated herein by reference.

Cores 140 may comprise one or more microprocessors without interlocked pipeline stages (MIPS) cores, advanced reduced instruction set computing (RISC) machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to DPU 130. The load/store unit may also include logic for flushing cache segments and/or cache lines to non-coherent buffer memory 138 and/or memory external to DPU 130. In some examples, the load/store unit may be configured to prefetch data from main memory during or after a cache segment or cache line is flushed.

As described herein, processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent buffer memory 138 in a segment of the level 1 cache 141. As described herein, concurrent with execution of work units by cores 140, a load store unit of memory controller 144 may be configured to prefetch, from non-coherent buffer memory 138, data associated with work units within WU queues 143 that are expected to be processed in the future, e.g., the WUs now at the top of the WU queues and next in line to be processed. For each core 140, the load store unit of memory controller 144 may store the prefetched data associated with the WU to be processed by the core into a standby segment of the level 1 cache 141 associated with the processing core 140.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 3:
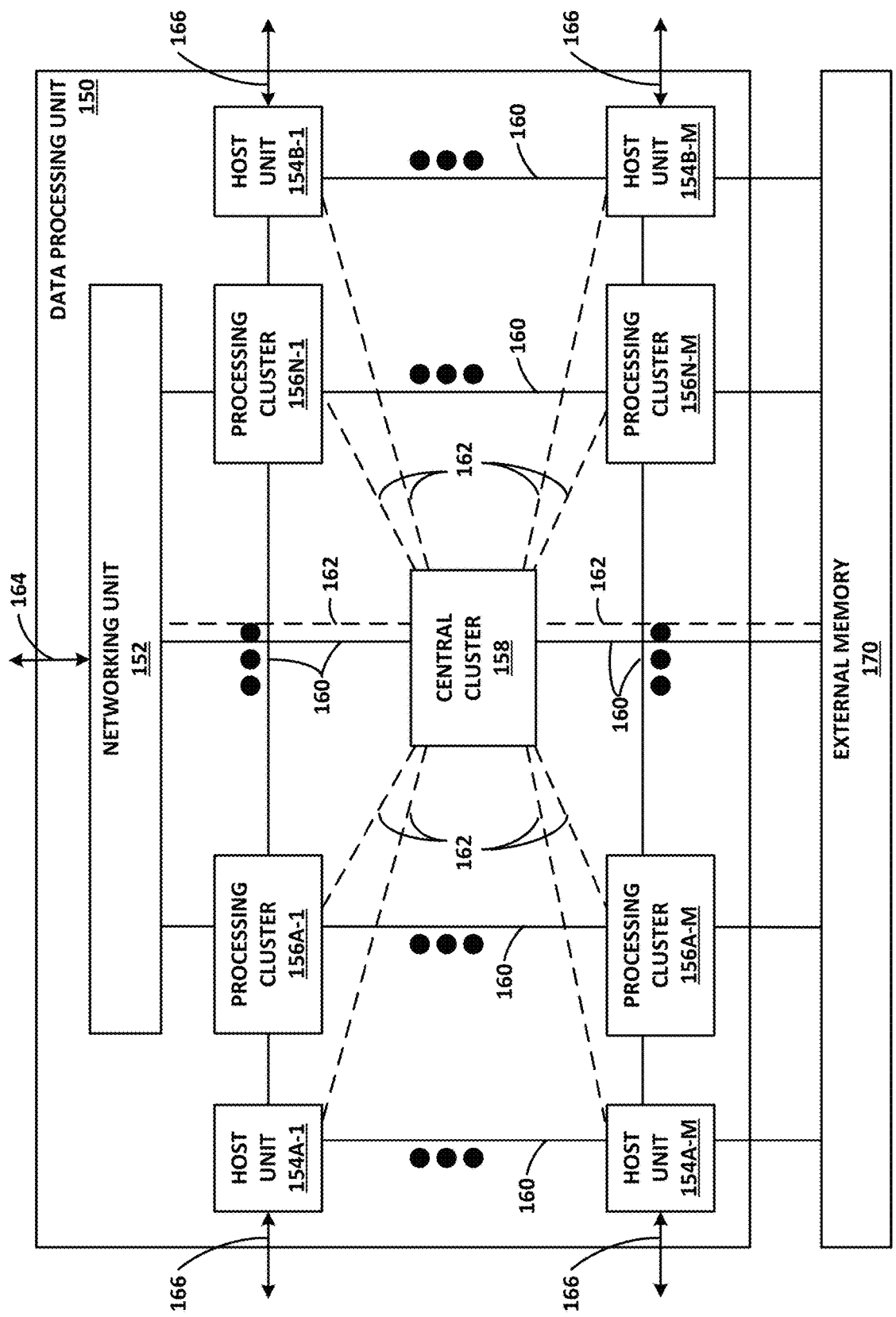
FIG. 3 is a block diagram illustrating another example data processing unit including two or more processing clusters, in accordance with the techniques of this disclosure.

FIG. 3 is a block diagram illustrating one example of a DPU 150 including a networking unit, at least one host unit, and two or more processing clusters. DPU 150 may operate substantially similar to any of the access nodes 117 of FIG. 1. Thus, DPU 150 may be communicatively coupled to a data center fabric (e.g., switch fabric 114), one or more server devices (e.g., servers 112), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 3, DPU 150 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of DPU 150, as further described in U.S. patent application Ser. No. 62/589,427, filed Nov. 21, 2017, the entire content of which is incorporated herein by reference.

As described herein, in some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

Figure 4:
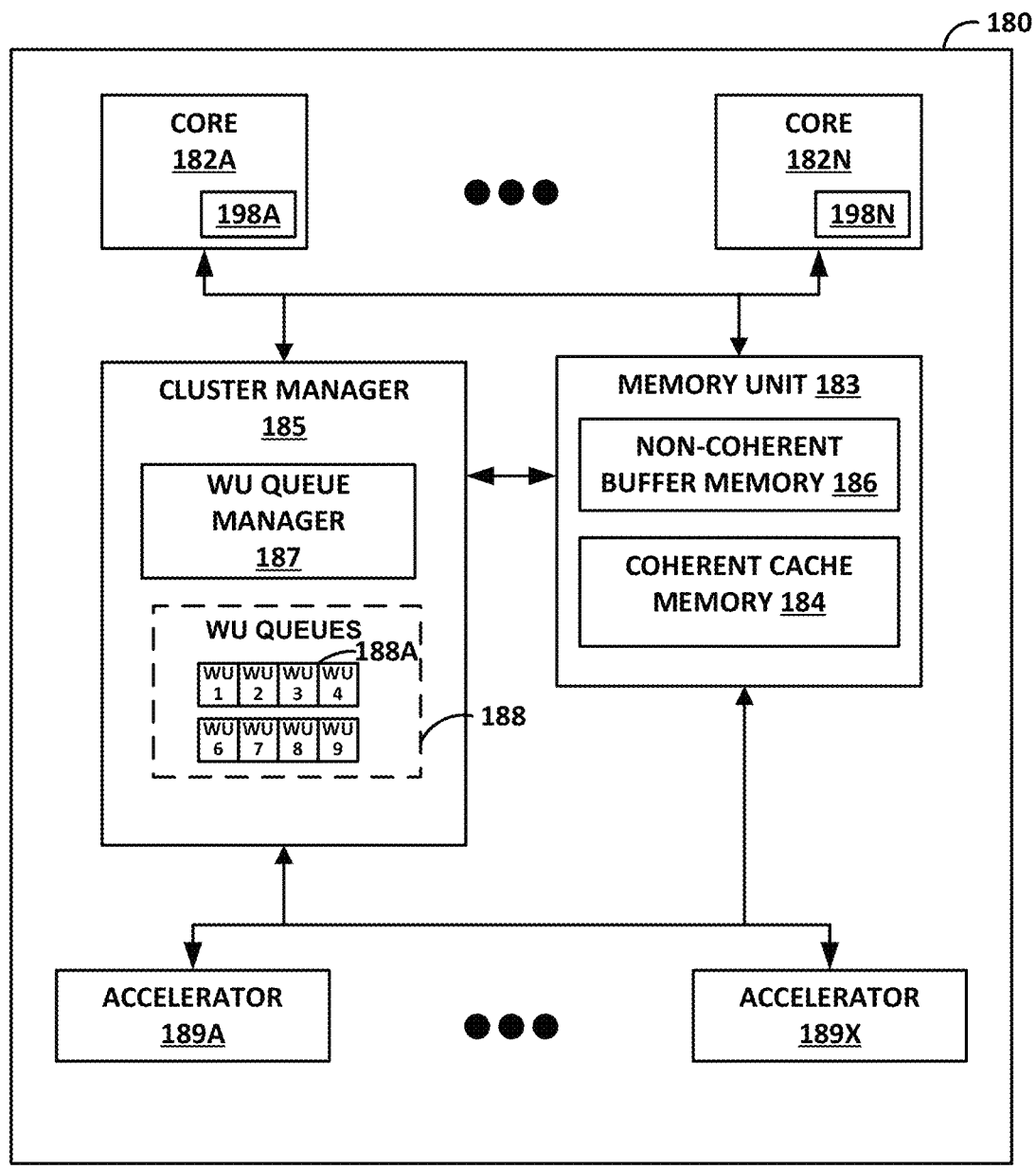
FIG. 4 is a block diagram illustrating an example processing cluster including a plurality of programmable processing cores, in accordance with the techniques of this disclosure.

FIG. 4 is a block diagram illustrating another example processing cluster 180 including a plurality of programmable processing cores 182A-182N. Each of processing clusters 156 of DPU 150 of FIG. 3 may be configured in a manner substantially similar to that shown in FIG. 4. In the example of FIG. 4, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

An access node or DPU (such as access nodes 117 of FIG. 1, DPU 130 of FIG. 2, or DPU 150 of FIG. 3) may support two distinct memory systems: a coherent memory system and a non-coherent buffer memory system. In the example of FIG. 4, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

As noted above, in accordance with the techniques of this disclosure, one or more of accelerators 189 may be configured to evaluate regular expressions. A JPEG accelerator of accelerators 189, in accordance with the techniques of this disclosure, may include a hardware-implemented JPEG compression and decompression engine that further compresses image data for storage or decompresses (i.e., removes the further compression) the image data for retrieval.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent buffer memory 186A and/or external memory 170. Core 182A may first look for the corresponding data in cache 198A, and in the event of a cache miss, may access the data from non-coherent buffer memory 186A and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

As described herein, in some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

Figure 5:
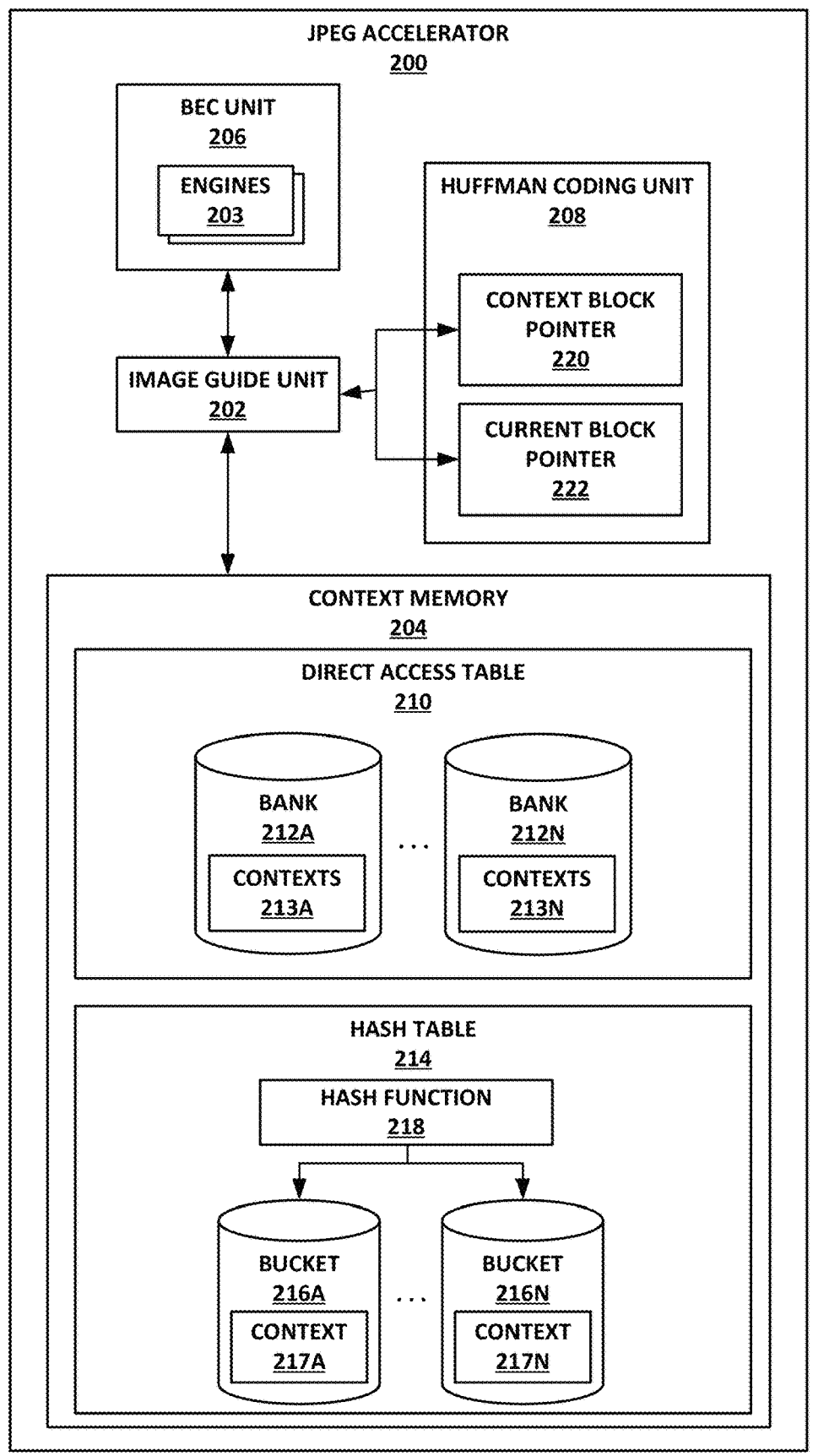
FIG. 5 is a block diagram illustrating an example Joint Picture Experts Group (JPEG) accelerator, in accordance with the techniques of this disclosure.

FIG. 5 is a block diagram illustrating an example JPEG accelerator 200, in accordance with the techniques of this disclosure. JPEG accelerator 200 may correspond to one of accelerators 146 of FIG. 2 or one of accelerators 189 of FIG. 4. While JPEG accelerator 200 is described herein as being configured for JPEG, in some examples, JPEG accelerator 200 may be configured to apply for other image compression techniques. For instance, JPEG accelerator 200 may be referred to as an example of an "image coding unit." In this example, JPEG accelerator 200 includes image guide unit 202, engines 203, context memory 204, Binary Entropy Coding (BEC) unit 206, and Huffman coding unit 208. In some examples, BEC coding unit 206 may be configured to perform binary arithmetic coding, such as, for example, context-adaptive binary arithmetic coding (CABAC). In other examples, BEC unit 206 may be configured to apply other entropy coding techniques.

Some aspects of this disclosure include configuring JPEG accelerator 200 to include one or more mechanisms to achieve higher throughput while keeping smaller footprint with single pass processing of input. For example, JPEG accelerator 200 may be configured to use a trailing pointer to Huffman decode to reduce the amount of intermediate storage as described herein. In some examples, JPEG accelerator 200 may be configured to use of dependency graph to exploit parallelism across blocks in same component as described herein. In some examples, JPEG accelerator 200 may be configured to encode LNZ (e.g., instead of a number of non-zero coefficients (NNZ)) to exploit the maximum parallelism within a coefficient block as described herein.

Some aspects of this disclosure include configuring JPEG accelerator 200 to include techniques to split context memory in direct access (e.g., direct access table 210) and hash access (e.g., hash table 214) to significantly reduce the size of context memory with less than 1% loss in compression. For example, JPEG accelerator 200 may be configured to build a bounding box for "ideal" amount of direct access as described herein. In some examples, JPEG accelerator 200 may be configured to perform best effort hashing with no collision resolution (e.g., keys are not stored.) as described herein In some examples, JPEG accelerator 200 may be configured with a layout of direct memory access to help to eliminate bank collisions as described herein.

Some aspects of this disclosure include configuring JPEG accelerator 200 to include techniques to use multiple (e.g., 8) engines to encode in round robin for helping to ensure maximum utilization of all engines as described herein. For example, JPEG accelerator 200 may be configured to building a work queue based on current work to maximize the amount of work available all the time for engines as described herein.

Some aspects of this disclosure include configuring JPEG accelerator 200 to include techniques to build a speculative decode/encode probability tree to reduce turnaround time in case of keys with previous bit dependency (e.g., LNZ High/LNZ Low) as described herein. For example, JPEG accelerator 200 may be configured to file it as generic and useful for RED encoding/decoding.

Some aspects of this disclosure include configuring JPEG accelerator 200 to use LNZ and NNZ for coding. For example, JPEG accelerator 200 may be configured to determine contexts using a LNZ syntax element and context-based code coefficient values using the contexts.

In general, image guide unit 202 represents a processing unit (implemented in circuitry) that controls operation of other components of JPEG accelerator 200. For example, image guide unit 202 may receive work units from external components (such as processing cores) to encode or decode a JPEG image. In particular, one or more cores of a processing cluster, such as cores 182 of processing cluster 180 in FIG. 4, execute one or more instructions to cause JPEG accelerator 200 to encode a JPEG image into encoded image data or decode encoded image data to decode a JPEG image.

Generally, in response to receiving an encoded image to be stored, Huffman coding unit 208 decodes Huffman-coded data for syntax elements of the encoded image, and image guide unit 202 causes BEC unit 206 to reencode the decoded data using BEC. Additionally, JPEG accelerator 200 may rearrange the data to allow for parallel coding in an efficient manner, in accordance with the techniques of this disclosure as discussed in greater detail below. Likewise, in response to receiving an encoded image from storage to be output, BEC unit 206 decodes BEC-coded data for syntax elements of the encoded image, and image guide unit 202 causes Huffman coding unit 208 to reencode the decoded data using JPEG-compliant Huffman coding. Similarly, JPEG accelerator 200 may rearrange the data back into JPEG-compliant format.

Image guide unit 202 may be implemented, at least in part, in hardware, software, firmware or any combination thereof. For example, image guide unit 202 may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, image guide unit 202 may represent software instructions executed by one or more microprocessors.

Engines 203, which may include one or more encoding engines and/or one or more decoding engines, may be configured to process different syntax elements for a single block of image data in parallel. The engines may code values of syntax elements of one block in parallel with each other and/or in parallel with values of syntax elements of other blocks. For example, a first decoding engine of engines 203 may decode a first set of one or more bits of a syntax value of an image retrieved from storage. In this example, image guide unit 202 may determine that the first set of the one or more bits have values indicating that one or more values of respective instances of one or more other syntax elements are to be decoded. For instance, the first decoding engine of engines 203 may determine that a syntax element for coefficient map values indicates a first coefficient is to be decoded. In this example, a second decoding engine of engines 203 may decode one or more bits of one of more values of the respective instances of the one or more other syntax elements.

Image guide unit 202 may be configured to build a work queue based on current work to maximize the amount of work available all the time for engines 203. In some examples, BEC unit 206 does not encode trailing zeroes in a block.

To improve performance, image guide unit 202 may be configured to use 8 encode/decode engines. In some examples, image guide unit 202 may be configured to use 2-7 or more than 8 encode/decode engines. During encoding, image guide unit 202 may have all the information about the image. But during decoding, image guide unit 202 may have to wait for decoded bits to know if any given coefficient has to be decoded further. This may not pose a challenge when image guide unit 202 is decoding a first bit as LNZ value provides enough information on how many bits of coefficient map to decode. But as image guide unit 202 moves beyond the first bit of a coefficient map, a number of coefficients drops and continues to drop as image guide unit 202 moves on to higher order bits. Image guide unit 202 may wait for the coefficient map to be decoded first and then determine how many bits to be decoded based on the gate bits. But with this technique, the utilization of engines 203 drops significantly. Instead, in some example, image guide unit 202 may deploy and use a work queue based approach where engines 203 each have a cognizance of what bit is decoded and what are the further decoded that entail with current bit value. For example, when BEC unit 206 is decoding LNZ, image guide unit 202 may cause engines 203 to go from a high order bit to low order bits. Assuming a bit number 3 was set. This means that image guide unit 202 may have at least 16 coefficients to decode length bit 0. In this example, engine 203 may not have to wait for values from bit number 2, 1, and 0 to start work. Similarly, if a gate value of the coefficient came out to be zero then image guide unit 202 may determine that at least one bit is to be decoded.

Each such encode/decode process may be referred to as "work" for one of engines 203. Having such awareness helps image guide unit 202 create a queue of work for engines 203. Each of engines 203 in turn refers to the queue and takes the maximum work a respective engine can consume and spreads the work evenly across all the available engines. This approach helps to increase utilization of engines 203 and thus helps to provide optimum performance.

Huffman coding unit 208 may decode a received JPEG image to be stored and re-encode the image retrieved from storage to be output permit image data representing a JPEG image to be compressed for storage. In the example of FIG. 5, Huffman coding unit 208 may decode respective blocks of a JPEG image. Huffman coding unit 208 may generally decode one or more blocks of the JPEG image in parallel. In particular, any block currently being decoded (or encoded) by Huffman coding unit 208 may be referred to as a "current block." The current block may be specified by current block pointer 222. In some examples, Huffman coding unit 208 decodes from a block specified by context block pointer 220. In some examples, Huffman coding unit 208 may decode multiple blocks in parallel. For instance, Huffman coding unit 208 may decode a first block specified by current block pointer 222 and, in parallel, decode a second block specified by context block pointer 220.

Context memory 204 may store context data, corresponding to data decoded by Huffman coding unit 208 or BEC unit 206. For example, context memory 204 may store context decoded from a current block specified by context block pointer 220. In some examples, context memory 204 may store context decoded from a current block specified by context block pointer 220. As shown, context memory 204 may include direct access table 210 and hash table 214. Usage of context memory 204 may be reduced by using LNZ for decoding coefficient map values from megabytes to 10's of kilobytes.

A probability distribution may be built in the form of a N-dimensional array, where N is number of contexts image guide unit 202 may use. In some examples, the value of N may vary from 1 to 5 depending on what image guide unit 202 is encoding. The high dimensionality of context may create a relatively large probability table. Storing the relatively large table close to engine may increase the area on chip and may increase the access latency impacting the performance of JPEG accelerator 200. In some applications, tables are created for maximum possible values but the values actually used may be limited. In some examples, image guide unit 202 may use a linked list. However, maintaining linked lists in memory may not be very efficient to do in hardware and the memory taken by linked list maintenance may also be unacceptable.

In accordance with techniques described herein, image guide unit 202 may build a bounding box for the N dimensional array. This bounding box may be a subset of the actual array and dimensions of this box that are based on values that are more likely to hit this box. To address outliers, even though most of the time image guide unit 202 is going to be using values in the bounding box, image guide unit 202 may use a small hash table. In this way, image guide unit 202 may be able to absorb ~90% of entries in the table for high resolution images and ~96% of entries in table for medium resolution images and ~98% of entries in low resolution images. With this approach, image guide unit 202 may reduce the size of context memory by orders of magnitude and hence able to keep the context array very close to engine. This improves latency in access and thus gives a major boost to performance.

Again, the context memory may be relatively large so image guide unit 202 may be configured to use a direct access N dimensional array (e.g., direct access table 210) as part of context memory 204 and hash table 214 as part of context memory 204. Image guide unit 202 may divide context memory 204 in direct access table 210 and hash table 214 based on the bounding box in an image. Use of hash table 214 may help to reduce the size of table by orders of magnitude but there still is an issue of storing the keys for hash table for collision resolution. Configuring image guide unit 202 with an efficient hashing algorithm, right set of elements for key, and an optimal hash table size, image guide unit 202 obtains a very small amount collision. Collision in some cases does pollute the probability distribution but the impact is minimal and advantage no collision resolution in our case is very high. The reduction in compression when compared to a fully instantiated N dimensional array is ~1% on average.

Direct access table 210 may include banks 212A-212N ("banks 212"). For example, a first set of contexts 213A may be stored in bank 212A and a second set of contexts 213N may be stored in bank 212B. For instance, bank 212A may store a first entry mapping a first context of contexts 213A to an indication of a first block and a second entry mapping a second context of contexts 213A to a second block. Similarly, bank 212N may store a first entry mapping a first context of contexts 213N to an indication of a third block and a second entry mapping a second context of contexts 213N to a fourth block.

Image guide unit 202 may cause direct access table 210 to fetch contexts from banks 212. For example, to access an entry of bank 212A mapping particular context for a block specified by BEC unit 206, image guide unit 202 may fetch bank 212A. In this example, image guide unit 202 may output the particular context of contexts 213A that is mapped to the block specified by BEC unit 206.

Image guide unit 202 may specify banks as corresponding to different syntax elements for blocks of image data. For example, image guide unit 202 may specify that bank 212A stores a LNZ syntax element. In this example, image guide unit 202 may specify that bank 212B stores an AC high coefficient map syntax element. In this way, bank collisions may be reduced or eliminated.

Hash table 214 may represent a data structure mapping identifiers to corresponding context. As shown, hash table 214 may include hash function 218 and buckets 216A-216N (buckets 216). For example, to determine particular context for a block specified by BEC unit 206, image guide unit 202 may output an identifier to hash function 218. Hash function 218 may "map" the first identifier to a first value of a first reference block to bucket 216A. That is, rather than explicitly mapping a unique bucket to each identifier, hash function 218 generates an output specifying a bucket to effectively map the first identifier to a first value of a first reference block to bucket 216A.

Hash function 218 may be configured to minimize collisions. For example, in response to receiving a first identifier to a first value of a first reference block, hash function 218 may indicate bucket 216A. In this example, in response to receiving a second identifier to a second value of a first reference block, hash function 218 may indicate bucket 216N. However, in some instances, a collision may occur. For example, in response to receiving a first identifier to a first value of a first reference block, hash function 218 may indicate bucket 216A. In this example, however, in response to receiving a second identifier to a second value of a first reference block, hash function 218 may indicate bucket 216A.

To help to improve engine efficiency, image guide unit 202 may generate enough work to make sure engines 203 have tasks and help to prevent memory access from being a bottle neck. To help to prevent memory access from being a bottle neck, image guide unit 202 may refrain from performing memory access in one shot. For example, image guide unit 202 may use a direct access array and no collision resolution in hashing. To address memory access latency, image guide unit 202 may keep hash table 214 very small and close to engines 203. Moreover, to help to prevent memory access from being a bottle neck, image guide unit 202 may be configured for parallel access.

Some techniques to ensure parallel access is to add banks in memory. However, such techniques may represent a best effort approach that does not ensure parallel access. Image guide unit 202 may use information for the mechanism by which image guide unit 202 is generating work and access pattern generated by the dependency graph to partition the memory in banks in a way that there is no bank collision.

Hash table 214 may be configured to use no collision resolution. For example, hash table 214 may store a first context entry corresponding to a first value of a first reference block to hash bucket 216A. In this example, in response to hash function 218 mapping a second identifier to hash bucket 216A, hash table 214 may output the first context entry corresponding to the first value of the first reference block. In this manner, in response to a collision between the first value and the second value, the context data used to code the first value and the second value will be the same.

Hash table 214 may be configured to use a queue data structure. For example, image guide unit 202 may, when accessing hash table 214, submit requests to access hash table 214 through a queue data structure. In general, a queue data structure has a first-in, first-out data storage and retrieval behavior, in that data is retrieved from the queue data structure in the same order as the data is stored to the queue data structure.

BEC unit 206 may encode and decode image data for storage. For example, BEC unit 206 may entropy encode coefficients decoded by Huffman coding unit 208 for storage at external memory 170. In another example, BEC unit 206 may entropy decode coefficients received from external memory 170 that are to be encoded by Huffman coding unit 208.

In some examples, BEC unit 206 may code using context information. For example, BEC unit 206 may encode a current block specified by current block pointer 222 using context stored in context memory 204. In some examples, BEC unit 206 may encode a current block specified by current block pointer 222 using context decoded from a context block specified by context block pointer 220. Similarly, BEC unit 206 may decode data for a current block using context information stored in context memory 204.

Figure 6:
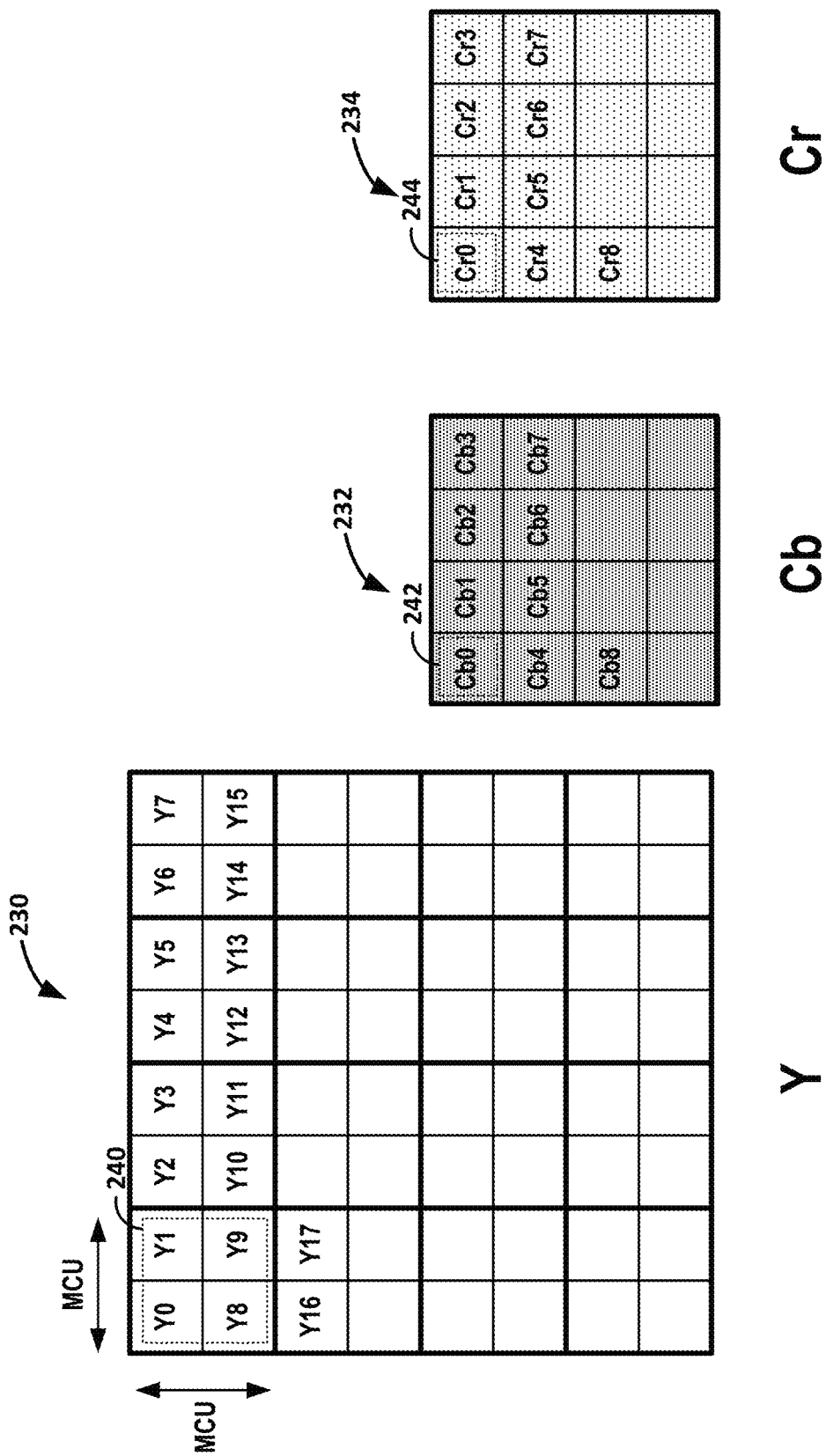
FIG. 6 is a conceptual diagram illustrating a logical layout of coefficient blocks of a 3 component image with 2×2, 1×1, 1×1 Minimum Coded Unit (MCU) size, in accordance with the techniques of this disclosure.

FIG. 6 is a conceptual diagram illustrating a logical layout of coefficient blocks of a 3 component image with 2×2, 1×1, 1×1 MCU size, in accordance with the techniques of this disclosure. A JPEG Image may include three components (e.g., Y, Cb, and Cr) which may be derived from red-green-blue (RGB). Each component in a JPEG image may be broken into coefficient blocks (e.g., 8×8). The blocks of components may be interleaved when stored in image JPEG file. An MCU number of blocks of a component that is found next to each other may be used before jumping to next component. For example, a MCU conversion unit implemented in circuitry may use 1, 2, or 4 MCU blocks of a component that is found next to each other before jumping to next component. Each component may have its own MCU value. For context based probability calculation of a block, a MCU conversion unit implemented in circuitry may use the block to the LEFT of current block, the block ABOVE the current block, and the block on left above DIAGONAL to the current block of the same component.

In the example of FIG. 6, each unit of Y (e.g., Y0-Y17) may represent a 2×2 MCU matrix and each unit of Cb (e.g., Cb0-Cb8), and Cr (e.g., Cr0-Cr8) may represent a 1×1 MCU matrix. For example, a MCU conversion unit implemented in circuitry may generate the luma 'Y' component 230 to include a 2×2 block 240 representing luma data for a block of pixels of a JPEG image. Similarly, the MCU conversion unit may generate the chroma blue 'Cb' component 232 to include a 1×1 block representing blue-difference chroma for the block of pixels of the JPEG image. Similarly, the MCU conversion unit may generate the chroma red 'Cr' component 234 to include a 1×1 block 244 representing a red-difference chroma for the block of pixels of the JPEG image. In this example, blocks 240, 242, and 244 may each form an MCU for rendering the block of pixels of the JPEG image.

Figure 7:
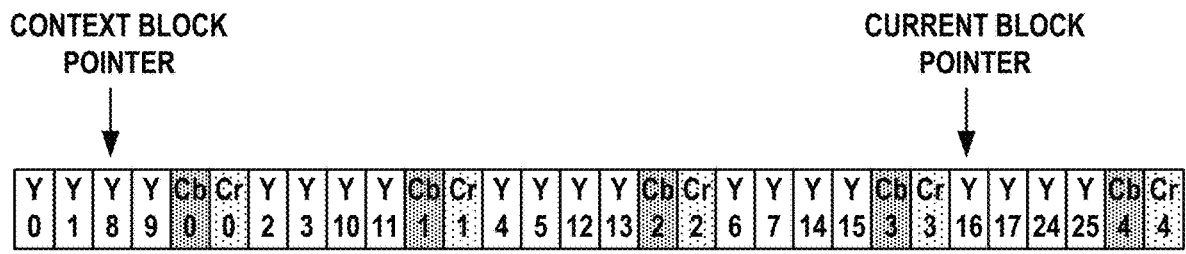
FIG. 7 is a conceptual diagram illustrating Huffman encoded blocks with scan encode order, in accordance with the techniques of this disclosure.

FIG. 7 is a conceptual diagram illustrating Huffman encoded blocks with scan encode order, in accordance with the techniques of this disclosure. As shown in FIG. 7, blocks may be stored sequentially. To get context blocks a MCU conversion unit implemented in circuitry may either (1) store the Huffman decoded blocks in memory, (2) store the Huffman encoded blocks in memory and decode the context blocks, or (3) use trailing pointers and decode the context block by reading the image again. Storing the Huffman decoded blocks in memory and storing the Huffman encoded blocks in memory and decode the context blocks may use a relatively large amount of intermediate storage. Storing the Huffman encoded blocks in memory and decode the context blocks and using trailing pointers and decode the context block by reading the image again may use Huffman decoders.

In accordance with one or more techniques described herein, a MCU conversion unit implemented in circuitry may be configured to use a hybrid of storing the Huffman decoded blocks in memory and using trailing pointers and decode the context block by reading the image again may use Huffman decoders to effectively balance an amount of storage used and a number of decoders used. For example, a MCU conversion unit implemented in circuitry may be configured to use two trailing pointers, one for current block and one for block above. Again, rather than storing all decoded Huffman encoded blocks in memory, image guide unit 202 may cause Huffman coding unit 208 to decode Huffman encoded blocks that include context information.

In the example of FIG. 7, image guide unit 202 may specify current block pointer 222 to code Huffman encoded block Y16 of luma 'Y' component 230 and specify context block pointer 220 to code Huffman encoded block Y8 of luma 'Y' component 230. For example, Huffman coding unit 208 may decode Huffman encoded block Y8 to determine context for Huffman encoded block Y16. For instance, BEC unit 206 may receive an output from Huffman coding unit 208 that includes a decoded block for Huffman encoded block Y8 and a decoded block for Huffman encoded block Y16. In this example, BEC unit 206 may encode a compressed coefficient block for Huffman encoded block Y16 using the decoded Huffman encoded block Y16 and using the decoded Huffman encoded block Y8 as context. In this way, BEC unit 206 may use context from Huffman encoded block Y8 without relying solely on storing of decoded Huffman blocks.

Figure 8:
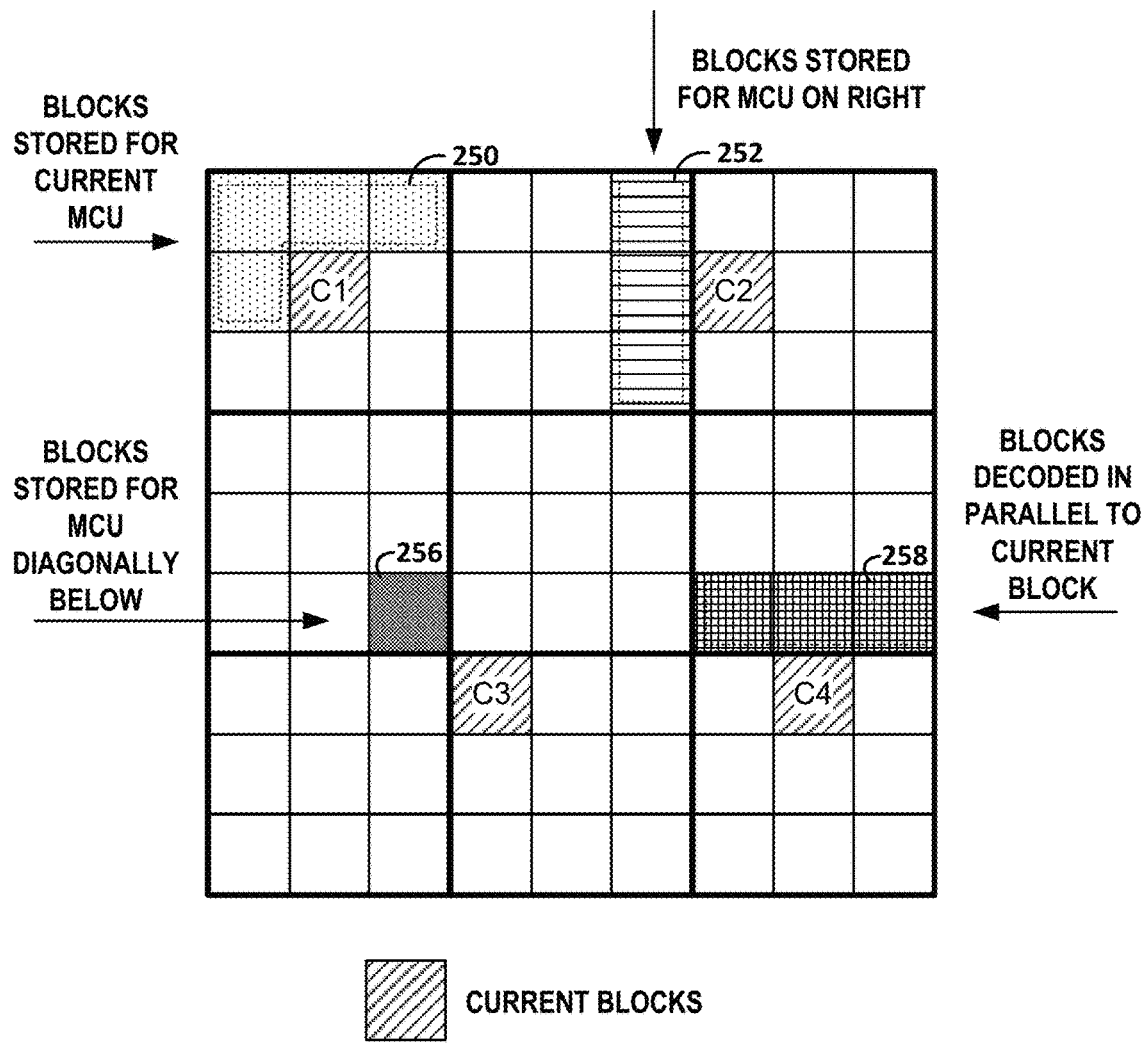
FIG. 8 is a conceptual diagram illustrating examples of context block storage for MCUs, in accordance with the techniques of this disclosure.

FIG. 8 is a conceptual diagram illustrating examples of context block storage for MCUs, in accordance with the techniques of this disclosure. A MCU conversion unit implemented in circuitry may be configured to store the recent decoded blocks to be used as LEFT and DIAGONAL for the next block. However, as shown, this may pose some challenges because of how MCUs are stored and image. In some examples, the MCU conversion unit may be configured to keep a minimum amount of data. For instance, the MCU conversion unit may be configured to keep a minimum amount of data for MCUs as large as 4×4.

In a first example, image guide unit 202 may store blocks 250 for current block C1 in context memory 204. For instance, image guide unit 202 may cause Huffman coding unit 208 to decode Huffman encoded blocks into blocks 250 that are stored (e.g., uncompressed, compressed, etc.) at context memory 204. BEC unit 206 may encode current block C1 using blocks 250 as context.

In a second example, image guide unit 202 may store blocks 252 for current block C2 in context memory 204. For instance, image guide unit 202 may cause Huffman coding unit 208 to decode Huffman encoded blocks into blocks 252 that are stored at context memory 204. BEC unit 206 may encode current block C2 using blocks 252 as context.

In a third example, image guide unit 202 may store block 256 for current block C3 in context memory 204. For instance, image guide unit 202 may cause Huffman coding unit 208 to decode Huffman encoded blocks into blocks 256 that are stored at context memory 204. BEC unit 206 may encode current block C3 using blocks 256 as context.

Again, image guide unit 202 may determine context for decoding a block rather than relying solely on context block storage. For example, image guide unit 202 may cause Huffman coding unit 208 to decode Huffman encoded blocks into blocks 258 in parallel to decoding a Huffman encoded block into blocks C4. In this example, BEC unit 206 may encode current block C4 using blocks 258 as context.

Figure 9:
FIG. 9 is a conceptual diagram illustrating a zig-zag scan order, a direct current (DC) coefficient, alternating current (AC) low coefficients, and AC high coefficients, in accordance with the techniques of this disclosure.
Figure 9:
Figure 9:

FIG. 9 is a conceptual diagram illustrating a zig-zag scan order, a direct current (DC) coefficient, alternating current (AC) low coefficients (also referred to herein as simply "low coefficients"), and AC high coefficients (also referred to herein as simply "high coefficients"), in accordance with the techniques of this disclosure. In the example of FIG. 9, image guide unit 202 may cause JPEG accelerator 200 to code coefficients of block 70 in a zig-zag scan order. For example, JPEG accelerator 200 may code coefficients 0, 1, 2, 3, 4, 5, and so on until reaching coefficient 63 or a last-non zero coefficient in that order. As shown, image guide unit 202 may specify coefficient 0 as a DC coefficient. In some examples, image guide unit 202 may specify coefficients 1, 2, 3, 5, 6, 9, 10, 14, 15, 20, 21, 27, 28, and 35 as low AC coefficients. In some examples, image guide unit 202 may specify coefficients 1, 5, 6, 14, 15, 27, and 28 as a first "zone" of low AC coefficients and coefficients 2, 3, 9, 10, 20, 21, and 35 as a second "zone" of low AC coefficients. In some examples, image guide unit 202 may specify coefficients 4, 7, 8, 11-13, 16-19, 22-26, 29-34, and 36-63 as AC high coefficients.

BEC unit 206 may code a LNZ high syntax element. In general, the LNZ high syntax element may represent a last non-zero AC high coefficient in the zig-zag scan order. For example, BEC unit 206 may code a value for a LNZ high syntax element of block 70, which may represent a last non-zero AC high coefficient of the high AC coefficients (e.g., coefficients 4, 7, 8, 11-13, 16-19, 22-26, 29-34, and 36-63) of block 70 in zig-zag scan order. For instance, a LNZ high syntax element may have a value representing coefficient 51 when coefficient 51 is non-zero and coefficients 52-63 are zero. Similarly, BEC unit 206 may code a LNZ low syntax element. For example, BEC unit 206 may code a value for a LNZ low syntax element of block 70, which may represent a last non-zero AC low coefficient of low AC coefficients (e.g., coefficients 1, 2, 3, 5, 6, 9, 10, 14, 15, 20, 21, 27, 28, and 35) of block 70 in zig zag scan order. For instance, a LNZ low syntax element may specify coefficient 14 when coefficient 14 is non-zero and coefficients 15, 20, 21, 27, 28, and 35 are zero.

BEC unit 206 may use the LNZ high syntax element to determine context for decoding other syntax elements. For example, BEC unit 206 may determine context corresponding to one or more of a value for a AC high coefficient map syntax element, a non-zero AC high values syntax element, a LNZ low syntax element, or another syntax element. As used herein, AC high coefficient map syntax element may represent a coefficient map of AC High coefficients with zero value (e.g., coefficient 4), and a non-zero AC high values syntax element may represent high coefficient values (e.g., coefficients 7, 8, 11-13, 16-19, 22-26, 29-34, and 36-63).

BEC unit 206 may use the context to code syntax elements. For example, BEC unit 206 may use the context to code a non-zero AC high values syntax element, LNZ low syntax element, a non-zero AC low values syntax element, a DC coefficient syntax element, or another syntax element. As used herein, AC low coefficient map syntax element may represent a coefficient map for AC Low coefficients with zero value (e.g., coefficient 1), a non-zero AC low values syntax element may represent coefficient values (e.g., coefficients 2, 3, 5, 6, 9, 10, 14, 15, 20, 21, 27, 28, and 35), and a DC coefficient syntax element may represent a constant offset.

BEC unit 206 may store coefficients of a block (e.g., block 70) if a map value is non-zero. For example, in an 8×8 block, because of DCT and quantization, most of the data tends may be accumulated in one corner and has trailing zeroes. In some examples, a number of non-zero coefficient in a block is used as a context value which is used in encoding. For example, the number of non-zero coefficients in a block may be used as context for encoding one or more of a number of non-zero values in a next block, a coefficient, or another parameter. In some examples, BEC unit 206 may refrain from storing encoded trailing zeroes of a block (e.g., an 8×8 block).

The use of number of non-zero (NNZ) value may make the coefficient decoding linear as a BEC unit may stop decoding beyond last non-zero value. In accordance with techniques described herein, BEC unit 206 may store the position of last non-zero (LNZ) value. In this way, BEC unit 206 may decode all coefficients until a last non-zero value in parallel. In this example, all remaining bits of coefficients may use a remaining non-zero values as a context. However, the last non-zero value doesn't serve the purpose. To address the foregoing, BEC unit 206 may use a distance from LNZ as context for coding (e.g., encoding and/or decoding) coefficient map for coefficients. Once BEC unit 206 has the coefficient map, BEC unit 206 may calculate NNZ from the sum of the first bits. After BEC unit 206 calculates NNZ, BEC unit 206 can proceed to use the calculated NNZ as context, for example, for coefficients.

BEC unit 206 may code values for ordinal bits of the values of the coefficient map syntax elements using context based on the position of the last-non-zero coefficient. In particular, for a current coefficient, BEC unit 206 may determine a context for coding an ordinal bit of a value for the coefficient map syntax element as a distance between the position of the current coefficient and the position of the last-non-zero coefficient. Then, BEC unit 206 may code (e.g., encode or decode) the ordinal first bit of the current coefficient using the context.

BEC unit 206 may abstain from coding data for coefficients of block 70 following the first last-non-zero coefficient in the zig-zag scan order. For example, BEC unit 206 may abstain from coding data for coefficients 52-63 of block 70 following coefficient 51 when coefficient 51 is the last non-zero coefficient in the zig-zag scan order.

BEC unit 206 may code coefficients of block 70 preceding a LNZ coefficient in the zig-zag scan order according to contexts determined according to a distance between positions of coefficients of block 70 and the first position of the last-non-zero coefficient. For example, image guide unit 202 may calculate a number of non-zero elements between a position of coefficients of block 70 and the calculated position of the last-non-zero coefficient for block 70 to calculate the NNZ. In this example, BEC unit 206 may determine context according to the distance between positions of coefficients of block 70 and the first position of the last-non-zero coefficient. In this way, BEC unit 206 may use the distance from LNZ as context of the coefficient map to decode and/or encode. Once BEC unit 206 determines the distance, BEC unit 206 may proceed to use the distance as context. For example, BEC unit 206 may code coefficients using the distance as context.

BEC unit 206 may code data for coefficients of block 70 preceding the LNZ coefficient in the zig-zag scan order according to contexts determined according to a distance between positions of the coefficients of block 70 and the position of the last-non-zero coefficient. For example, BEC unit 206 may code data for coefficients 1-51 when coefficient 51 is a LNZ for the high AC coefficients according to contexts determined according to a distance between positions of the coefficients of block 70 and the position of the last-non-zero coefficient. In some examples, BEC unit 206 may code one or more of coefficients according to contexts in parallel. For example, BEC unit 206 may code data for one or more of coefficients 1-51 when coefficient 51 is a LNZ for the high AC coefficients according to contexts determined according to a distance between positions of the coefficients of block 70 and the position of the last-non-zero coefficient in parallel.

BEC unit 206 may code coefficients of block 70 preceding a first LNZ coefficient in the zig-zag scan order according to contexts determined according to a NNZ value. For example, BEC unit 206 may determine context according to a calculated NNZ. BEC unit 206 may determine context corresponding to a LNZ low syntax element, an ACH syntax element, an ACL syntax element, a DC coefficient syntax element, or another coefficient syntax element.

BEC unit 206 may code coefficient map values for coefficients of block 70. For example, BEC unit 206 may code a coefficient map for coefficients of block 70 before coding coefficients of block 70. As used herein, the coefficient map may include a plurality of gate bits that each indicate whether a respective coefficient of a block is to be coded.

Figure 10:
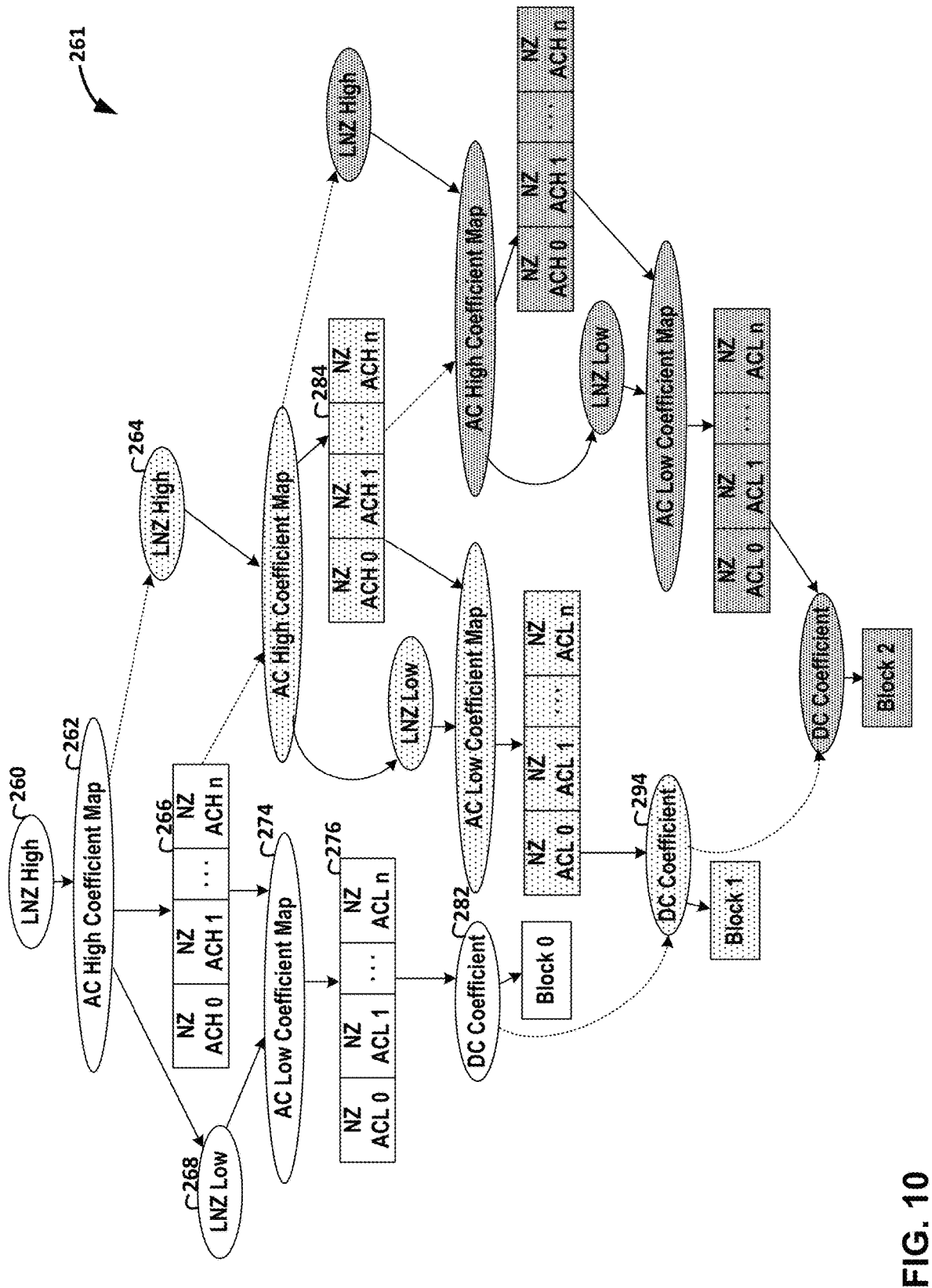
FIG. 10 is a conceptual diagram illustrating a dependency graph for context determinations for inter and intra block coefficients, in accordance with the techniques of this disclosure.

FIG. 10 is a conceptual diagram illustrating a dependency graph 261 for context determinations for inter and intra block coefficients, in accordance with the techniques of this disclosure. The context based probability generation for coefficients in a block (e.g., an 8×8 block) may depend cumulative statistics of all the previous blocks that have been encoded. This may pose a restriction while encoding and decoding an image. For example, a BEC unit may not encode or decode a current block in parallel to previous blocks. Rather than sequentially processing such blocks, image guide unit 202 may "dissect" dependencies to a finer level. For example, BEC unit 206 may begin coding part of a next block as soon as dependency requirements are met in a current block. In this way, BEC unit 206 may use a detailed dependency graph to apply a pipeline which can start working on next block (and a further block) in parallel to current block.

In general, as shown in FIG. 10, BEC unit 206 may use data of LNZ high syntax element 260 as context when coding AC high coefficient map syntax element 262. Likewise, BEC unit 206 may use AC high coefficient map syntax element 262 as context when coding LNZ low syntax element 268 and/or non-zero AC high values syntax element 266 (illustrated as "NZ ACH 0, NZ ACH 1, . . . NZ ACH n" and also referred to herein as simply "ACH syntax element 266").

Dependency graph 261 may generally indicate what syntax elements include data that is be used as context when coding other syntax elements (e.g., per the solid arrows for syntax elements within a block and per the dashed arrows for syntax elements in different blocks), and thus, which elements may be coded in parallel. For example, BEC unit 206 may code LNZ low syntax element 268 in parallel with ACH syntax element 266, because LNZ low syntax element 268 and ACH syntax element 266 do not depend on one another.

For example, BEC unit 206 may code a first syntax element of a first block of image data. For instance, BEC unit 206 may code a first value for LNZ high syntax element 260 for the first block. In this example, BEC unit 206 determines a first context for coding a second value of a second instance of the first syntax element of a second block of the image data. For instance, BEC unit 206 may determine a value of AC high coefficient map syntax element 262.

In this example, BEC unit 206 may context-based code a second value of the second instance of the first syntax element of the second block of the image data after coding the first value of the first instance of the first syntax element using the first context. For instance, BEC unit 206 may code a value of LNZ high syntax element 264 after coding the value of LNZ high syntax element 260 using AC high coefficient map syntax element 262.

In this example, BEC unit 206 may code a third value of a first instance of a second syntax element of the first block in parallel with coding the second value or after coding the second value. For instance, BEC unit 206 may code a value of ACH syntax element 266 in parallel with coding the value for LNZ high syntax element 264 or after coding the value for LNZ high syntax element 264.

Although, in the above examples, BEC unit 206 codes ACH syntax element 266 as a second syntax element, other syntax elements may be used, for example, but not limited to, an LNZ low syntax element 268, an AC low coefficient map syntax element 274, non-zero AC low values syntax element 276 (illustrated as "NZ ACL 0, NZ ACL 1, . . . NZ ACL n" and also referred to herein as simply "ACL syntax element 276"), a DC coefficient syntax element 282, or another syntax element.

In another example, BEC unit 206 may code a first value for ACH syntax element 266. In this example, BEC unit 206 may determine context for ACH syntax element 284. In this example, BEC unit 206 may context-based code ACH syntax element 284. In parallel with the context-based coding ACH syntax element 284 or after the context-based coding ACH syntax element 284, BEC unit 206 may code one or more of AC low coefficient map syntax element 274, NZ AC low values syntax element 276, a DC coefficient syntax element 282, or another syntax element.

In another example, BEC unit 206 may code a first value for AC low coefficient map syntax element 274. In this example, BEC unit 206 may determine context for DC coefficient syntax element 294. In this example, BEC unit 206 may context-based code DC coefficient syntax element 294. In parallel with coding DC coefficient syntax element 294 or after coding DC coefficient syntax element 294, BEC unit 206 may code DC coefficient syntax element 282.

Figure 11:
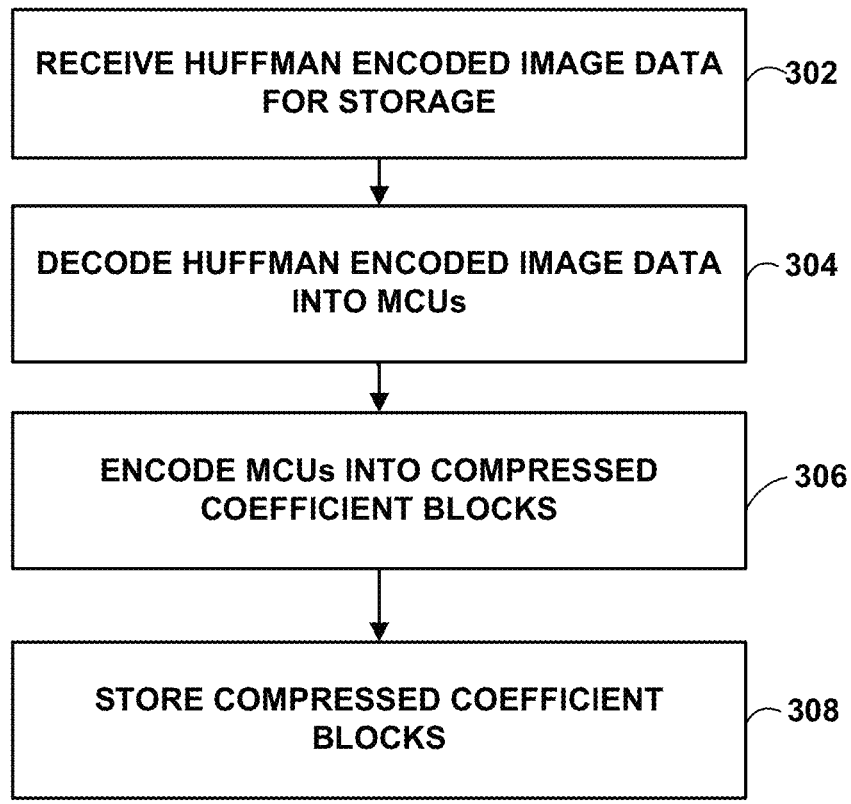
FIG. 11 is a flowchart illustrating example techniques for encoding an image, in accordance with the techniques of this disclosure.

FIG. 11 is a flowchart illustrating example techniques for encoding an image, in accordance with the techniques of this disclosure. Initially, JPEG accelerator 200 receives Huffman encoded image data for storage (302). Huffman coding unit 208 decodes the Huffman encoded image data into MCUs (304). BEC unit 206 encodes MCUs into compressed coefficient blocks (306). JPEG accelerator 200 stores the compressed coefficient blocks (308). For example, JPEG accelerator 200 stores the compressed coefficient blocks at external memory 170.

Figure 12:
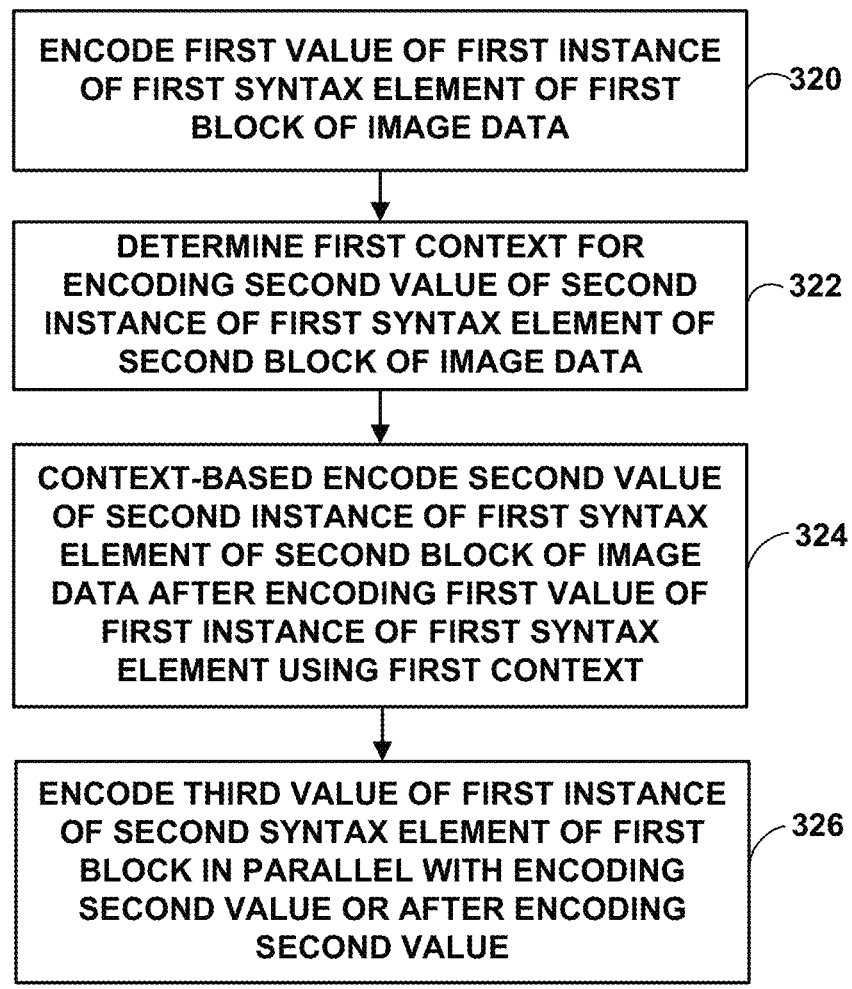
FIG. 12 is a flowchart illustrating example details for encoding MCUs, in accordance with the techniques of this disclosure.

FIG. 12 is a flowchart illustrating example details for encoding MCUs, in accordance with the techniques of this disclosure. The process of FIG. 12 represents an example of step 306 of FIG. 11. Initially, BEC unit 206 encodes a first value of a first instance of a first syntax element of a first block of image data (320). BEC unit 206 determines a first context for coding a second value of a second instance of the first syntax element of a second block of the image data (322). BEC unit 206 context-based encodes the second value of the second instance of the first syntax element of the second block of the image data after coding the first value of the first instance of the first syntax element using the first context (324). BEC unit 206 encodes a third value of a first instance of a second syntax element of the first block in parallel with coding the second value or after coding the second value (326).

Figure 13:
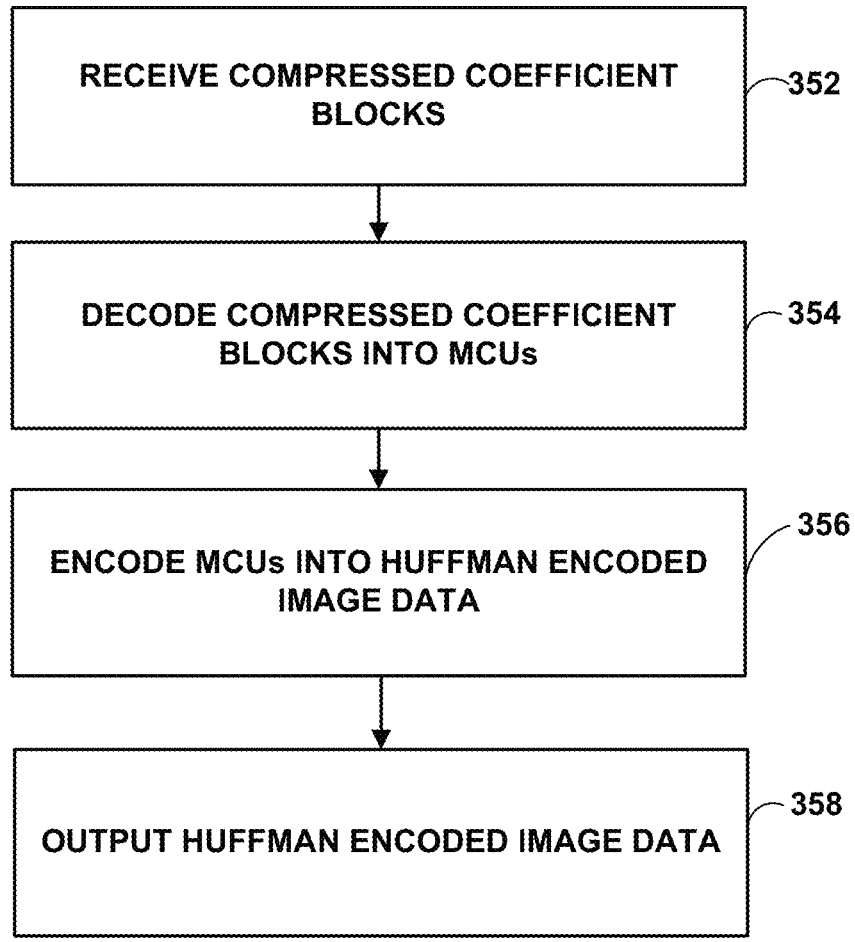
FIG. 13 is a flowchart illustrating example techniques for decoding an image, in accordance with the techniques of this disclosure.

FIG. 13 is a flowchart illustrating example techniques for decoding an image, in accordance with the techniques of this disclosure. Initially, JPEG accelerator 200 receives compressed coefficient blocks (352). BEC unit 206 decodes the compressed coefficient blocks into MCUs (354). Huffman coding unit 208 encodes the MCUs into Huffman encoded image data (356). JPEG accelerator 200 outputs the Huffman encoded image data (358).

Figure 14:
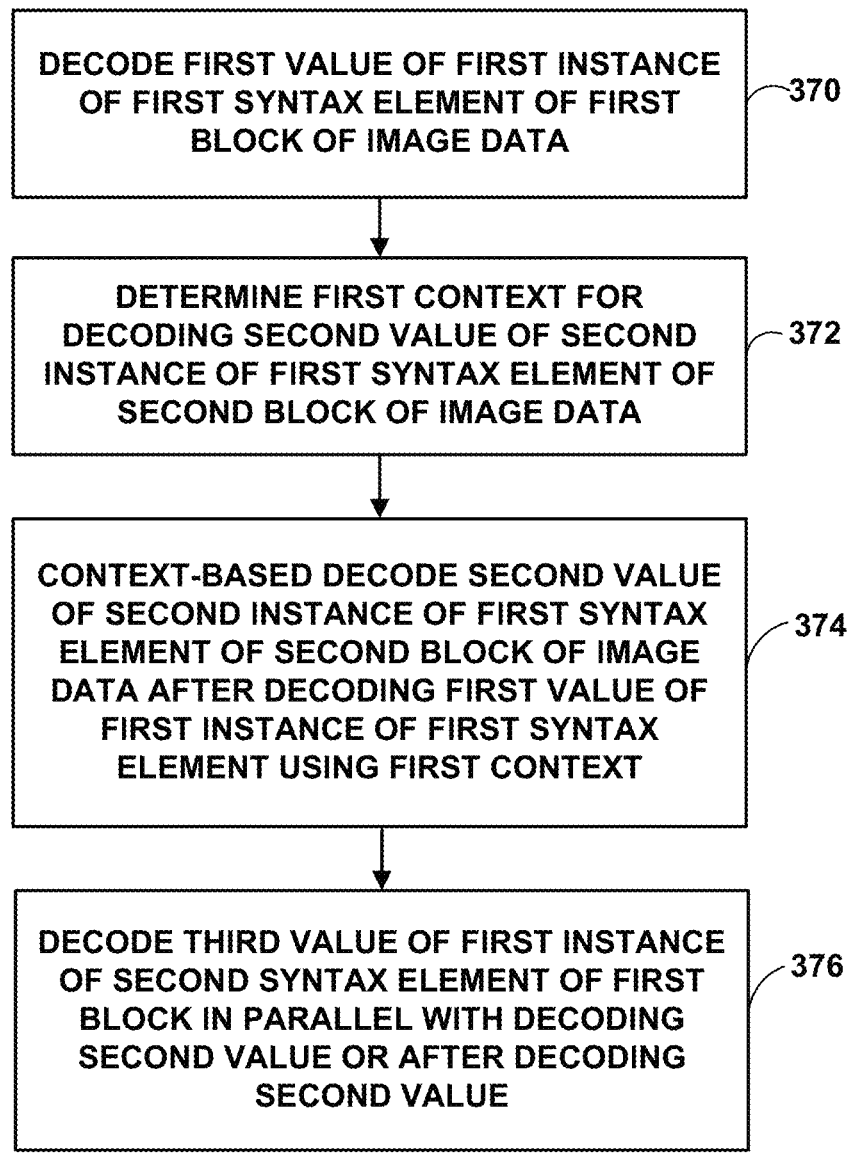
FIG. 14 is a flowchart illustrating example details for decoding MCUs, in accordance with the techniques of this disclosure.

FIG. 14 is a flowchart illustrating example details for decoding MCUs, in accordance with the techniques of this disclosure. The process of FIG. 14 represents an example of step 354 of FIG. 13. Initially, BEC unit 206 decodes a first value of a first instance of a first syntax element of a first block of image data (370). BEC unit 206 determines a first context for coding a second value of a second instance of the first syntax element of a second block of the image data (372). BEC unit 206 context-based decodes the second value of the second instance of the first syntax element of the second block of the image data after coding the first value of the first instance of the first syntax element using the first context (374). BEC unit 206 decodes a third value of a first instance of a second syntax element of the first block in parallel with coding the second value or after coding the second value (376).

Figure 15:
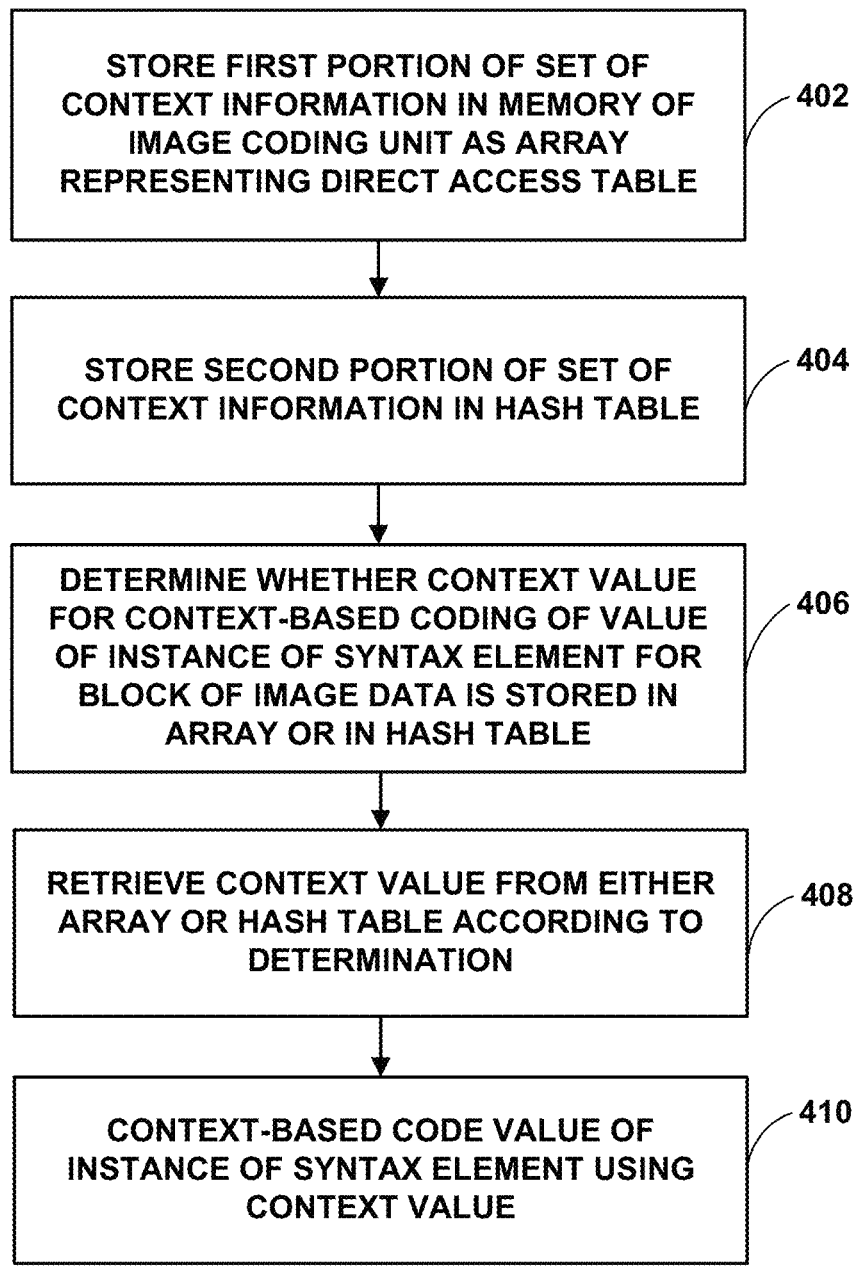
FIG. 15 is a flowchart illustrating example techniques for storing context information, in accordance with the techniques of this disclosure.

FIG. 15 is a flowchart illustrating example techniques for storing context information, in accordance with the techniques of this disclosure. Initially, image guide unit 202 stores a first portion of a set of context information in a memory of image coding unit as array representing direct access table (402). For example, image guide unit 202 stores a first portion of a set of context information context memory 204 as an array representing direct access table 210. Image guide unit 202 stores a second portion of the set of context information in a hash table (404). For example, image guide unit 202 stores a second portion of the set of context information in hash table 214.

Image guide unit 202 determines whether a context value for context-based coding of a value of an instance of a syntax element for the block of image data is stored in the array or in the hash table (406). For example, image guide unit 202 determines whether a context value for context-based coding of a value of an instance of a syntax element for the block of image data is stored in the direct access table 210 or in hash table 214. In some instances, the value may include a first value of a first instance of the syntax element for a first block and the context value may include a second value of a second instance of the syntax element for a second block. For instance, the first value may be for LNZ high syntax element 260 and the context value may be for LNZ high syntax element 264. Image guide unit 202 retrieves the context value from either the array or the hash table according to determination (408). BEC unit 206 context-based codes the value of the instance of the syntax element using context value (410).

Figure 16:
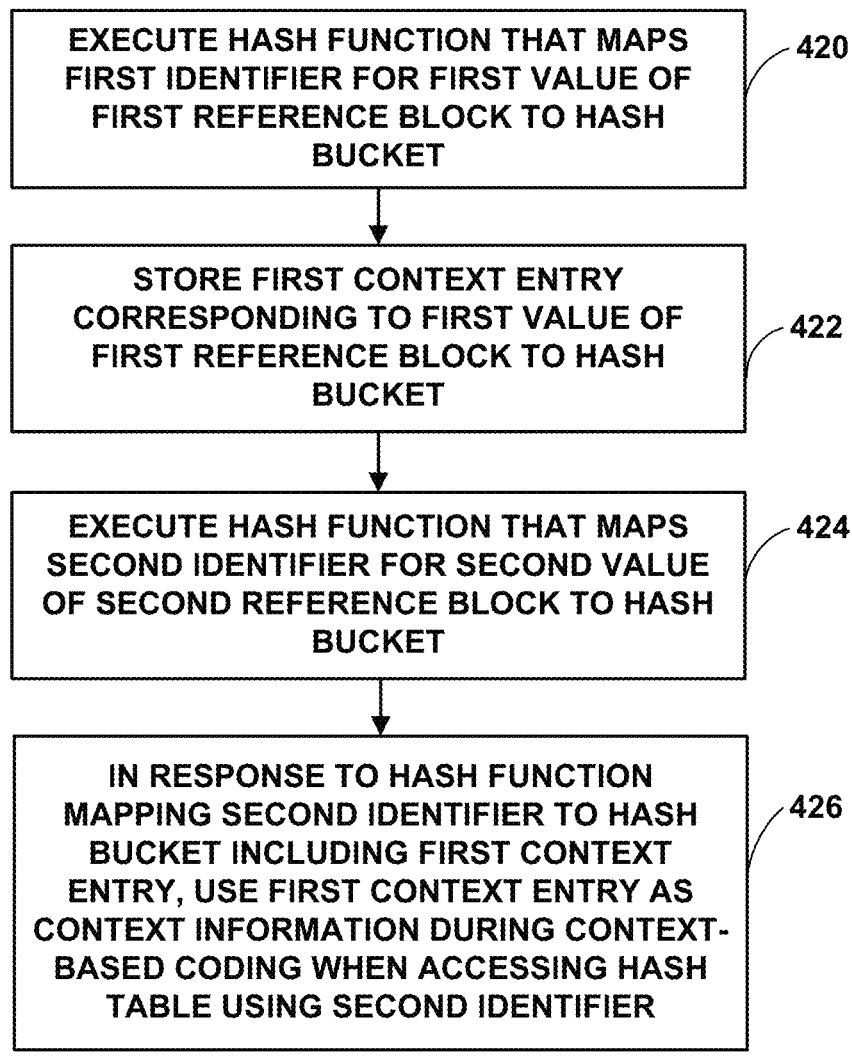
FIG. 16 is a flowchart illustrating example techniques for executing a hash function, in accordance with the techniques of this disclosure.

FIG. 16 is a flowchart illustrating example techniques for executing a hash function, in accordance with the techniques of this disclosure. The process of FIG. 16 represents an example of step 404 of FIG. 15. Initially, image guide unit 202 executes a hash function that maps a first identifier for first value of first reference block to a hash bucket (420). For example, image guide unit 202 executes hash function 218 that maps a first identifier for first value of first reference block to bucket 216A. Image guide unit 202 stores a first context entry corresponding to the first value of the first reference block to the hash bucket (422). For example, image guide unit 202 stores a first context entry corresponding to the first value of the first reference block to the bucket 216A. Image guide unit 202 executes a hash function that maps a second identifier for a second value of a second reference block to the hash bucket (424). For example, image guide unit 202 executes hash function 218 that maps a second identifier for second value of a second reference block to bucket 216A. In response to the hash function mapping the second identifier to the hash bucket including the first context entry, image guide unit 202 uses the first context entry as context information during context-based coding when accessing the hash table using second identifier (426).

Figure 17:
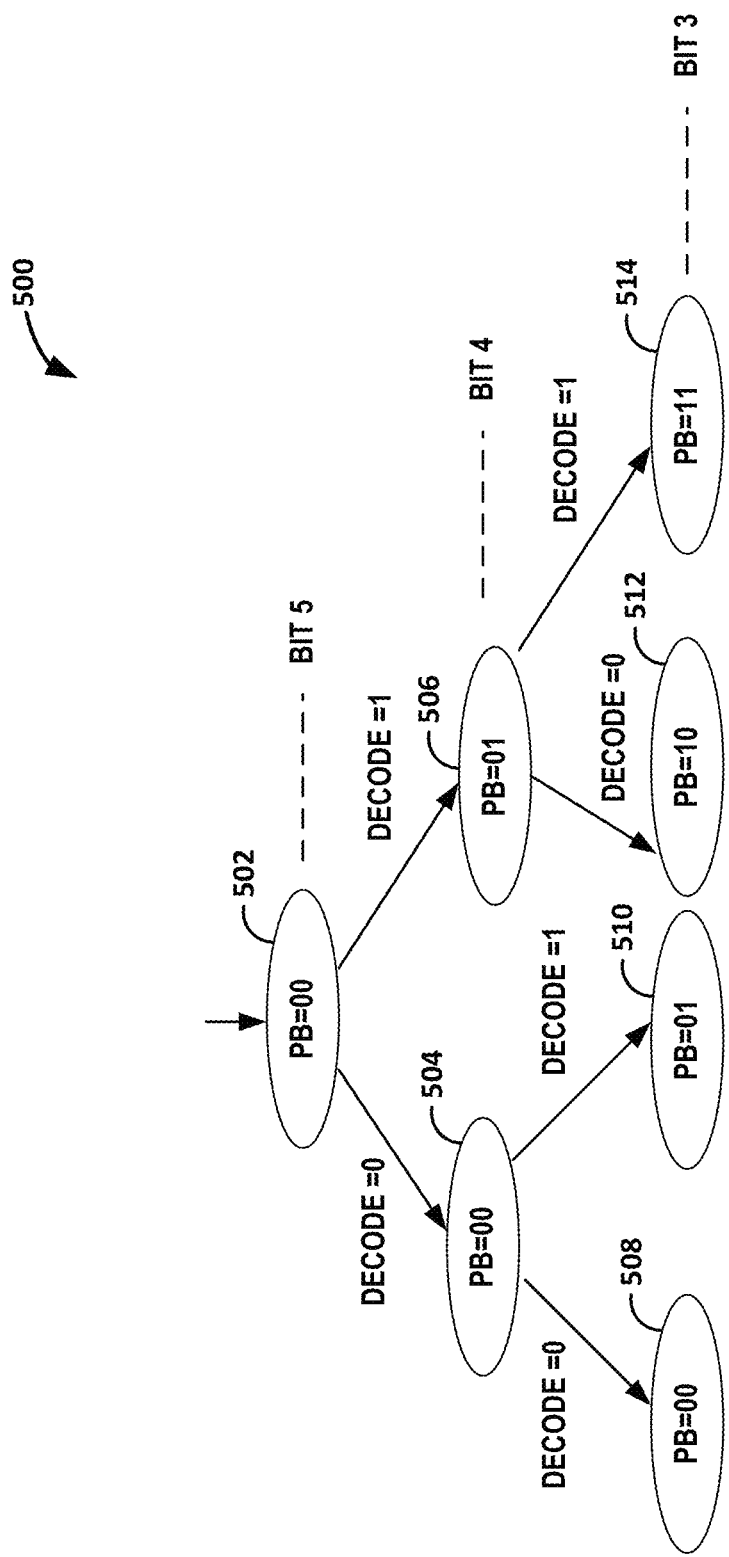
FIG. 17 is a conceptual illustrating example speculative decode tree for a last non-zero (LNZ) syntax element, in accordance with the techniques of this disclosure.

FIG. 17 is a conceptual illustrating example speculative decode tree 500 for a LNZ syntax element (e.g., LNZ high syntax element, LNZ low syntax element, etc.), in accordance with the techniques of this disclosure. Even with a work-queue based approach, there are certain restrictions which cause problems in pipelining decoding. For example, a dependency on previously encoded bits may cause problems in pipelining decoding. Pipelining the decoding a LNZ syntax element may include configuring engines 203 to use a few previous bits for checking if a current bit is zero or 1.

Generally, image guide unit 202 may build speculative decode tree 500 of depth "D" based on a predefined bounding box. Image guide unit 202 starts from the root node of speculative decode tree 500 and traverses the path based on the bit it decodes from the probability of parent node. Traversing the path based on the bit BEC unit 206 decodes may help to ensure that image guide unit 202 does not perform any unnecessary work and at the same time does not wait for a probability lookup after each decode. Such techniques may help to break apart one more "chain" of processes to be performed and enables higher utilization of image guide unit 202 giving higher throughput.

In the example of FIG. 17, BEC unit 206 decodes 3 bits at a time. However, in some examples BEC unit 206 may decode 1, 2, or more than 3 bits (e.g., 'n' bits) at a time. In this example, speculative decode tree 500 is associated with a LNZ syntax element. However, in some examples, BEC unit 206 may select a speculative decode tree associated with another syntax element that uses one or more previous bits as context. As shown, speculative decode tree 500 represents a sequence of bit values and a probability value associated with the sequence of bit values.

Initially, BEC unit 206 determines a node of speculative decode tree 500 having a sequence of bit vales corresponding to values of a set of one or more bits. For example, BEC unit 206 starts at node 502 for bit 5. BEC unit 206 decodes a next bit, following the set of bits (e.g., following bit 5), of the LNZ syntax element according to the probability value of the determined node of speculative decode tree 500. For example, BEC unit 206 decodes bit 4 for node 504 according to a context of '00', decodes bit 3 for node 508 according to a context of '00', and decodes bit 3 for node 510 according to a context of '01'. Similarly, BEC unit 206 decodes bit 4 for node 506 according to a context of '01', decodes bit 3 for node 512 according to a context of '10', and decodes bit 3 for node 514 according to a context of '11'.

Figure 18:
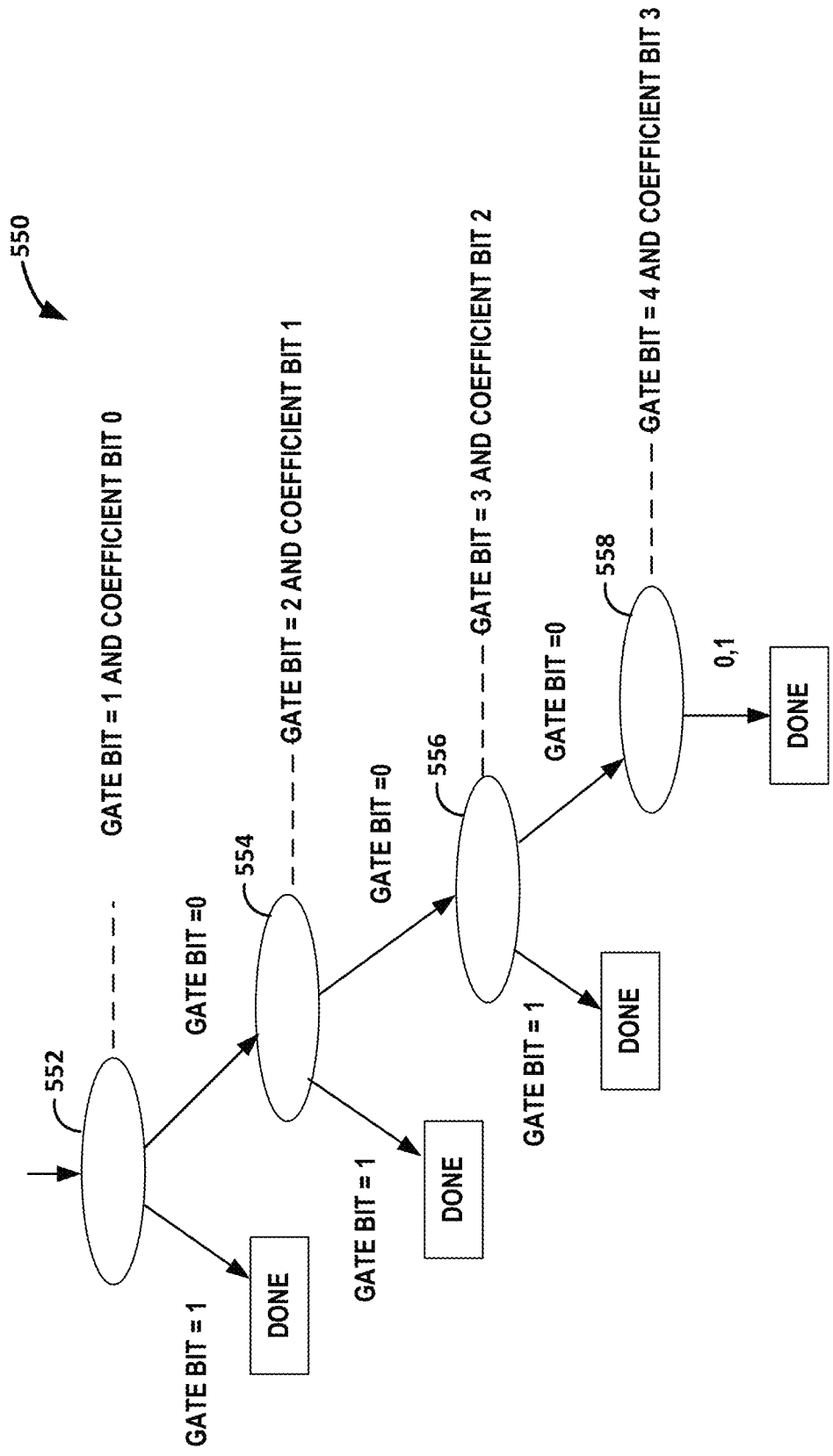
FIG. 18 is a conceptual illustrating example speculative decode tree for a coefficient, in accordance with the techniques of this disclosure.

FIG. 18 is a conceptual illustrating example speculative decode tree 550 for a coefficient, in accordance with the techniques of this disclosure. In the example of FIG. 18, BEC unit 206 decodes 4 bits at a time. However, in some examples, BEC unit 206 may decode 1, 2, 3, or more than 4 bits (e.g., 'n' bits) at a time.

Image guide unit 202 selects speculative decode tree 550 associated with a coefficient. Examples of coefficient syntax elements may include, but are not limited to, for example, ACH syntax element 266, ACL syntax element 276, or another coefficient syntax element. Image guide unit 202 determines a node of speculative decode tree 550 corresponding to the values of a set of one or more bits. For example, image guide unit 202 may start at node 552. In this example, BEC unit 206 may decode a next bit according to the probability value of the determined node of speculative decode tree 550. For example, BEC unit 206 may decode that a gate value is at least 1 for node 552, at least 2 for node 554, at least 3 for node 556, and at least 4 for node 558.

BEC unit 206 may decode syntax elements in parallel with decoding the gate syntax. For example, in response to determining that the gate value is at least 1, BEC unit 206 may decode (e.g., in parallel) a bit 0 of coefficient. In this example, in response to determining that the gate value is at least 2, BEC unit 206 may decode (e.g., in parallel) a bit 1 for coefficient. In response to determining that the gate value is at least 3, BEC unit 206 may decode (e.g., in parallel) a bit 2 for coefficient. In response to determining that the gate value is at least 4, BEC unit 206 may decode (e.g., in parallel) a bit 3 coefficient. In this way, image coding unit may decode up to 4 bits of coefficients using speculative decode tree 550.

Figure 19:
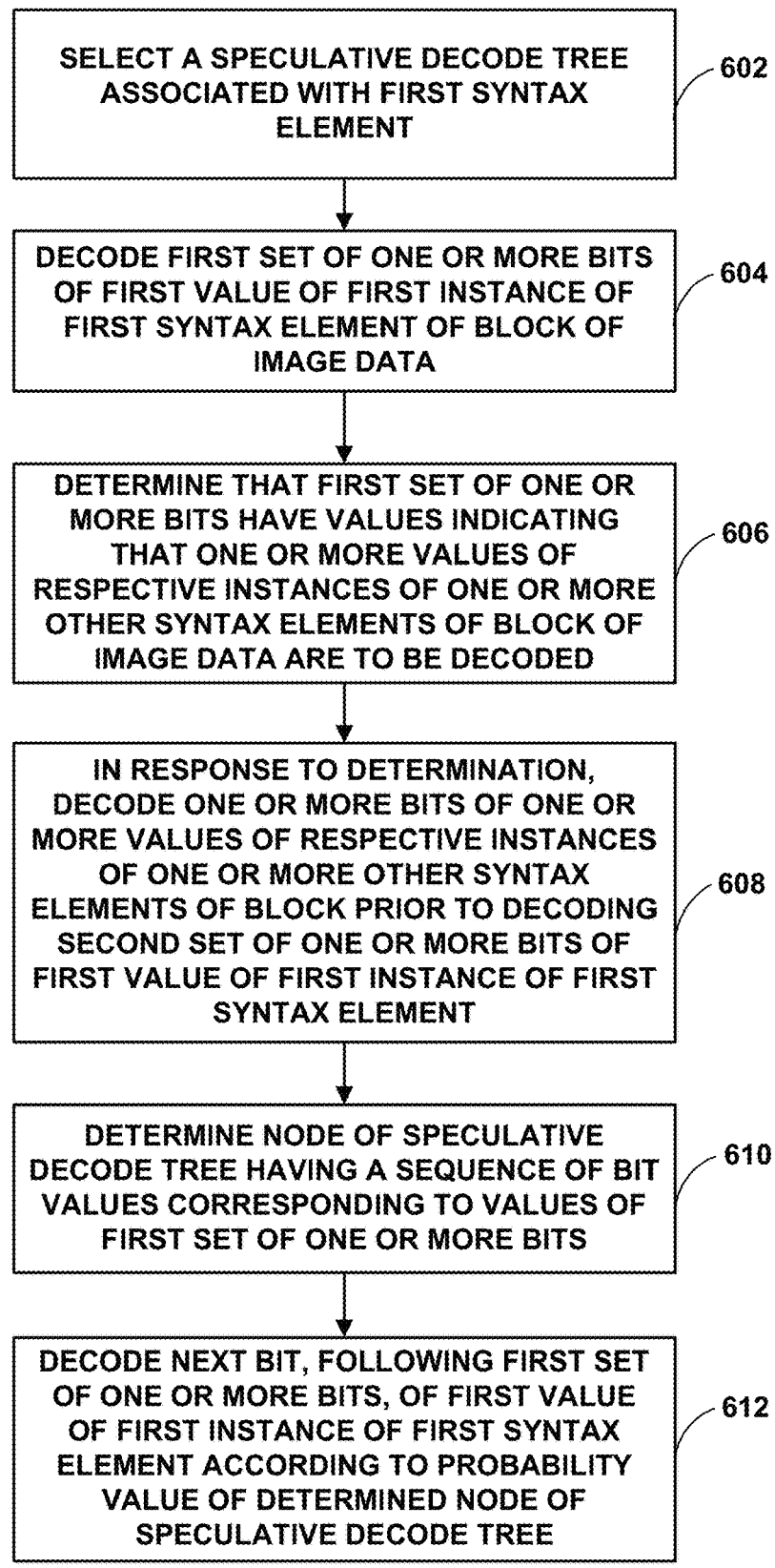
FIG. 19 is a flowchart illustrating example techniques for decoding to help to maximize performance, in accordance with the techniques of this disclosure.

FIG. 19 is a flowchart illustrating example techniques for decoding to help to maximize performance, in accordance with the techniques of this disclosure. Initially, image guide unit 202 selects a speculative decode tree associated with first syntax element (602). For example, image guide unit 202 selects speculative decode tree 550 associated with a LNZ syntax element.

BEC unit 206 decodes a first set of one or more bits of a first value of a first instance of a first syntax element of a block of image data (604). The first syntax element may be a gate syntax element for a transform coefficient of the block. For example, a first decoding engine of engines 203 decodes a first set of one or more bits of values of LNZ syntax element. For instance, the first decoding engine of engines 203 decodes a first bit of the LNZ syntax element. Again, the LNZ syntax element may represent a position of a last-non-zero coefficient in zig-zag scan order of the block. In some examples, the first set of one or more bits may include most significant bits of a first value of a first instance of the LNZ syntax element that define a minimum number of the transform coefficients to be decoded. In some examples, the one or more values of the respective instances of the one or more other syntax elements may correspond to no more than the minimum number of the transform coefficients to be decoded.

Image guide unit 202 determines that the first set of one or more bits have values indicating that one or more values of respective instances of one or more other syntax elements of the block of image data are to be decoded (606). For example, image guide unit 202 may determine that the first bit of the LNZ syntax element indicates syntax elements for transform coefficients of residual values of the block of image data are to be decoded. The one or more other syntax elements may include one or more of an ACH syntax element, an ACL syntax element, a DC coefficient syntax element, or another coefficient syntax element. For example, image guide unit 202 may determine that the first bit of the LNZ syntax element indicates one or more of an ACH syntax element, an ACL syntax element, a DC coefficient syntax element, or another coefficient syntax element are to be decoded.

In response to determination, BEC unit 206 decodes one or more bits of one or more values of respective instances of one or more other syntax elements of block prior to decoding second set of one or more bits of first value of first instance of first syntax element (608). For example, a second decoding engine of engines 203 decodes a one or more bits of one of more values of the respective instances of the one or more other syntax elements. For instance, the second decoding engine of engines 203 decodes a coefficient for the first bit. In some examples, engines 203 may code in parallel.

Image guide unit 202 determines a node of speculative decode tree having a sequence of bit values corresponding to values of first set of one or more bits (610). For example, the first decoding engine of engines 203 determines node 552 of speculative decode tree 550 has a sequence of bit values corresponding to values of first set of one or more bits of the LNZ syntax element.

BEC unit 206 decodes a next bit, following the first set of one or more bits, of a first value of a first instance of the LNZ syntax element according to probability value of determined node of speculative decode tree (612). For example, the first decoding engine of engines 203 decodes a next bit, following the first set of one or more bits, of a first value of the LNZ syntax element according to probability value of determined node 552 of speculative decode tree 550. For instance, the first decoding engine of engines 203 decodes coefficient bit 0 according to probability value of determined node 552, coefficient bit 1 according to probability value of determined node 554, and so on.

Figures 20, 21:
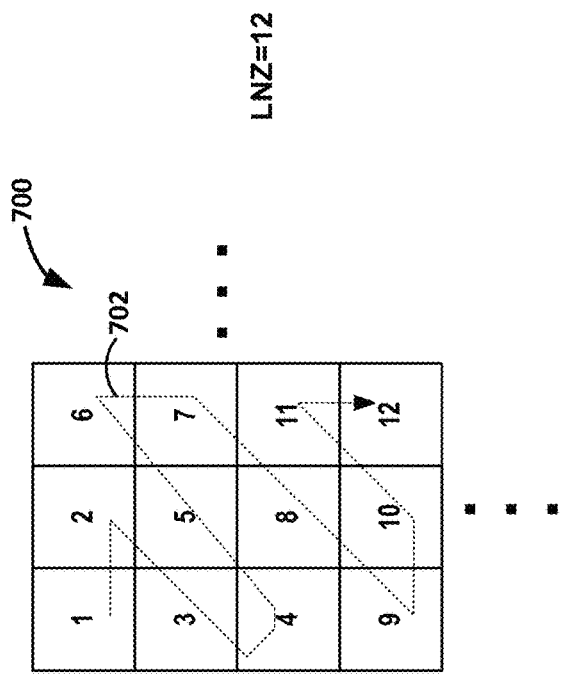
FIG. 20 is a conceptual diagram illustrating a scan order of coefficients of a block to be decoded, in accordance with the techniques of this disclosure.
FIG. 21 is a conceptual diagram illustrating an example table of coefficient map values and a number of non-zero coefficients (NNZ) values for the block of FIG. 20, in accordance with the techniques of this disclosure.

FIG. 20 is a conceptual diagram illustrating a scan order 702 of coefficients of a block 700 to be decoded, in accordance with the techniques of this disclosure. Block 700 may include other coefficients beyond coefficient 12 (e.g., one or more zero coefficients). In the example of FIG. 20, image guide unit 202 determines an indication of a LNZ syntax element for block 700 indicating a last non-zero coefficient (e.g., coefficient 12). For example, image guide unit 202 receives an indication of a LNZ syntax element for block 700 indicating a last non-zero coefficient (e.g., coefficient 12) to be decoded. In some examples, image guide unit 202 determines a last non-zero coefficient (e.g., coefficient 12) for encoding and generates the indication of a LNZ syntax element for block 700 to indicate the last non-zero coefficient. In some examples, LNZ syntax elements for block 700 may include a LNZ high syntax elements and two LNZ low syntax elements, e.g., as explained with respect to FIG. 9.

Image guide unit 202 may determine coefficients to decode based on the LNZ syntax element. For example, image guide unit 202 may determine that coefficients to decode comprise each coefficient of block 700 that occurs in a scan order for the block no later than a last non-zero coefficient (e.g., coefficient 12). As shown, in this example, BEC unit 206 decodes coefficients 1-12 in scan order 702. As shown, BEC unit 206 may decode coefficients 1-12 in ordinal order, which corresponds to a zig-zag scan order.

Image guide unit 202 may determine context for coding (e.g., decoding, encoding, etc.) values of syntax elements for each coefficient of block 700. For example, image guide unit 202 may determine a context for coding each coefficient of block 700 as a distance between the position of the respective coefficient and the position of the LNZ coefficient, as indicated by the value of the LNZ syntax element. For instance, image guide unit 202 may determine a context for coefficient 1 of block 700 as 11, a context for coefficient 2 of block 700 as 10, a context for coefficient 3 of block 700 as 9, and so on.

FIG. 21 is a conceptual diagram illustrating an example table 750 of coefficient map values 752 and calculated NNZ values 754 for coefficients of block 700 of FIG. 20, in accordance with the techniques of this disclosure. In some examples, coefficients 1-12 may be high coefficients. In some examples, coefficients 1-12 may be low coefficients corresponding to coefficients along a top row of a block and along a left edge of a block.

In the example of FIG. 21, BEC unit 206 context-based decodes coefficient map values 752 (also referred to herein as a "coefficient map") in parallel. A first engine of engines 203 may generate a map value of '1' for a coefficient 1 and a second engine of engines 203 may generate a map value of '1' for coefficient 2. Again, BEC unit 206 may context-based decode bits of coefficient map values 752 in parallel using context that is based on the LNZ syntax element, for instance, a distance of a respective coefficient to the LNZ coefficient indicated by the LNZ syntax element.

Coefficient map values 752 represent a map gate values, where the gate values represent coefficient values to be decoded. That is, coefficient map values represents whether to code a coefficient values. If a gate value of the coefficient map values is a '1,' the corresponding coefficient value is coded. If a gate value of the coefficient map values is a '0,' the corresponding coefficient value is not coded.

BEC unit 206 may calculate NNZ values 754 using coefficient map values 752. For example, to calculate NNZ values 754, BEC unit 206 may calculate the sum of coefficient map values 752 for coefficients of block 700 up to the last non-zero coefficient. BEC unit 206 may determine an updated NNZ value for each coefficient, where the updated NNZ value represents a number of remaining non-zero coefficients. That is, after determining an initial NNZ value, BEC unit 206 may subtract one from the NNZ value after passing a non-zero coefficient. For instance, BEC unit 206 may calculate a second NNZ value for coefficient 2 from a first NNZ value for coefficient 1 (e.g., 6) by subtracting one from the first NNZ value, because the gate value for the first coefficient is non-zero. Thus, the second NNZ value would be 5, in this example.

After calculating the NNZ values in this manner, BEC unit 206 may use the NNZ values as context information when coding the coefficients. For example, a first engine of engines 203 may context-based code the values of the syntax elements of a first coefficient using the NNZ value as context and, for each subsequent coefficient, a subsequent coding engine of engines 203 may context-based code the values of the syntax elements of the subsequent coefficient using the updated NNZ value in parallel with context-based coding, by the first coding engine, the values of the syntax elements of the first coefficient.

More specifically, for example, BEC unit 206 may determine context for decoding coefficient 1 based on the first NNZ value (e.g., 6). BEC unit 206 may decode values of syntax elements for the coefficients of block 700 in parallel. For example, a first engine of engines 203 may decode the values of the syntax elements of coefficient 1 of block 700 using the first value of NNZ values 754 as context (e.g., 6) in parallel with a second engine of engines 203 decoding the values of the syntax elements of coefficient 2 of block 700 using the second value of NNZ values 754 as context (e.g., 5), and so on.

Figure 22:
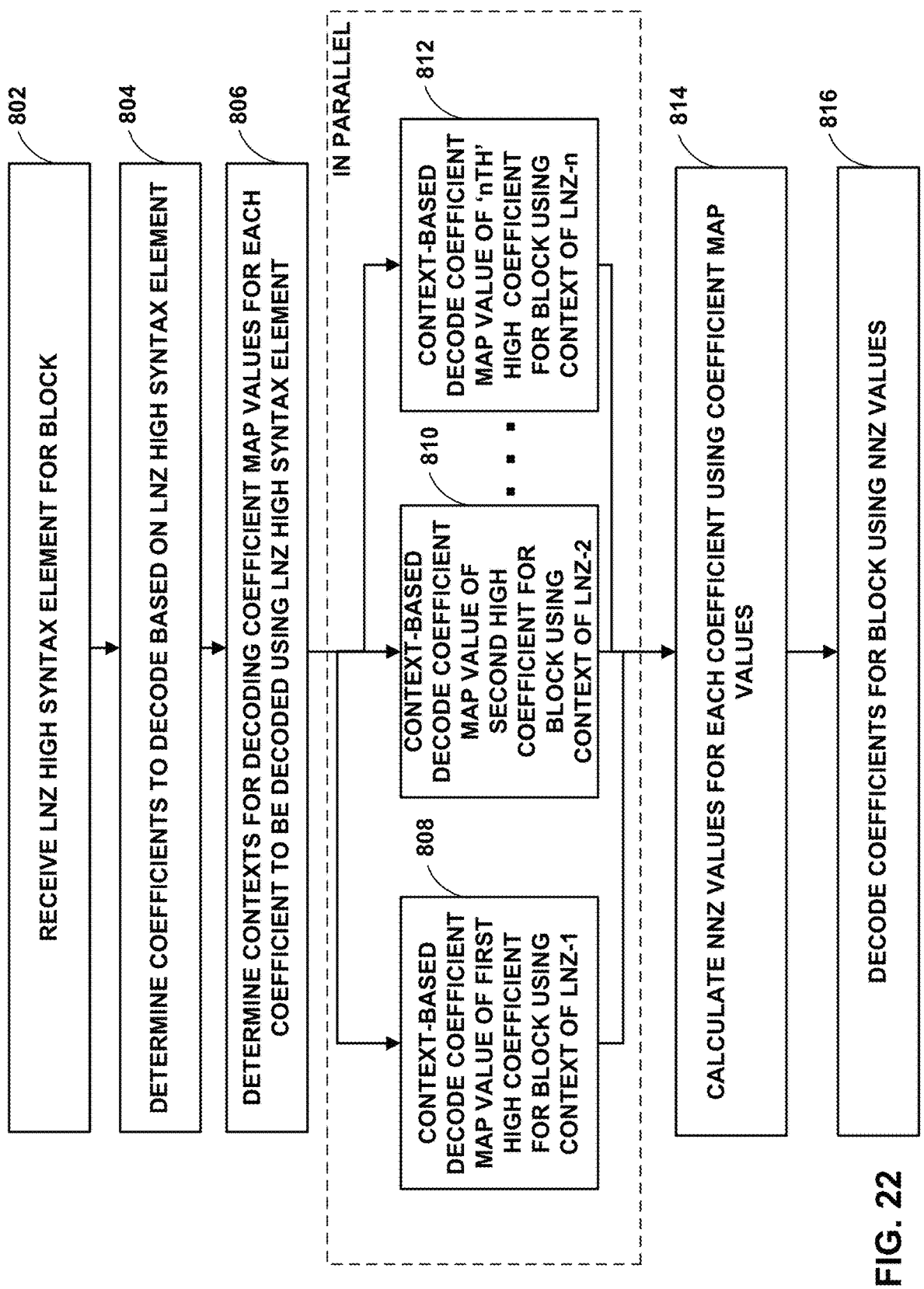
FIG. 22 is a flowchart illustrating example techniques for decoding using a LNZ syntax element, in accordance with the techniques of this disclosure.

FIG. 22 is a flowchart illustrating example techniques for decoding using a LNZ high syntax element, in accordance with the techniques of this disclosure. Initially, image guide unit 202 determines a LNZ high syntax element for a block (802). For example, image guide unit 202 receives one or more symbols in a bitstream indicating the LNZ high syntax element. In this example, the LNZ syntax element represents the high LNZ syntax element, although in other examples, the LNZ syntax element may represent a low LNZ syntax element. Image guide unit 202 determines coefficients of the block to decode based on the LNZ high syntax element (804). For example, image guide unit 202 determines the coefficients to be decoded include each coefficient occurring in a scan order for the block up to and including the last non-zero coefficient of the block indicated by the LNZ high syntax element.

Image guide unit 202 determines contexts for decoding coefficient map values for each coefficient to be decoded based on the LNZ syntax element (806). For example, image guide unit 202 determines a first context for decoding a gate value for a first high coefficient using a distance of the first high coefficient from the LNZ coefficient indicated by the LNZ high syntax element, a second context for decoding a gate value for a second high coefficient using a distance of the second high coefficient from the LNZ coefficient indicated by the LNZ high syntax element, and so on.

BEC unit 206 context-based decodes a coefficient map value for a first high coefficient for a block using the context of LNZ-1 (808). In the example of FIG. 22, BEC unit 206 context-based decodes a coefficient map value for a second high coefficient of the block using the context of LNZ-2 (810) and BEC unit 206 context-based decodes a coefficient map value for a 'nth' high coefficient for the block using the context of LNZ-n (812) in parallel with context-based decoding the coefficient map value for the first high coefficient. In this example, BEC unit 206 decodes a high coefficient map syntax element. However, in other examples, BEC unit 206 may decode an low coefficient map syntax element in substantially the same manner. In this example, BEC unit 206 decodes, however, in other examples, BEC unit 206 may encode a high coefficient map syntax element and/or a low coefficient map syntax element in substantially the same manner.

Each engine of engines 203 may context-based decode a respective coefficient map value. More specifically, for instance, a first engine of engines 203 may context-based decode a coefficient map value for a first high coefficient using the first context. Similarly, a second engine of engines 203 may context-based decode a coefficient map value for a second high coefficient using the second context. Again, in this example, engines 203 decode, however, in other examples, engines 203 may encode in substantially the same manner.

BEC unit 206 calculates a NNZ value for each high coefficient using the coefficient map values (814). For example, BEC unit 206 determines a first NNZ value for a first coefficient as a sum of coefficient map value. In this example, BEC unit 206 calculates a second NNZ value by subtracting the coefficient map value of the first coefficient from the first NNZ value. Likewise, BEC unit 206 calculates each subsequent NNZ value for a subsequent coefficient by subtracting the coefficient map value for the coefficient from the previous NNZ value.

BEC unit 206 may decode the coefficients for the block using the NNZ values (816). For example, a first engine of engines 203 may context-based decode the first coefficient using the first NNZ value as context, a second engine of engines 203 may context-based decode the second coefficient using the second NNZ value, and so on.

Various examples have been described. These and other examples are within the scope of the following claims.

What is claimed is:

1. A method comprising:
   determining, by an image coding unit implemented in circuitry of a device, an indication of a last-non-zero (LNZ) syntax element for a block of image data;
   determining, by the image coding unit, contexts for coding a coefficient map value for each coefficient of a plurality of coefficients of the block using the LNZ syntax element, wherein the coefficient map value for each coefficient of the plurality of coefficients indicates whether a respective coefficient of the plurality of coefficients is coded or not coded; and
   context-based coding, by the image coding unit, the coefficient map value for each of the plurality of coefficients in parallel using the respective contexts.

2. The method of claim 1, wherein context-based coding comprises:
   context-based coding, by a first coding engine of the image coding unit, a coefficient map value for a first coefficient of the plurality of coefficients in parallel with context-based coding, by a second coding engine of the image coding unit that is different from the first coding engine, a coefficient map value for a second coefficient of the plurality of coefficients.

3. The method of claim 1, further comprising:
   calculating, by the image coding unit, using the coefficient map values, a number of non-zero coefficients (NNZ) value as context for coding values of syntax elements of a first coefficient of the plurality of coefficients; and
   for each subsequent coefficient of the plurality of coefficients:

updating the NNZ value; and
using the updated NNZ value as context for coding values of syntax elements of the subsequent coefficient.

4. The method of claim 3, wherein calculating the first NNZ value comprises calculating a sum of the coefficient map values.

5. The method of claim 3, wherein updating the NNZ value comprises subtracting a coefficient map value for a previous coefficient from the NNZ value.

6. The method of claim 3, further comprising context-based coding, by image coding unit, the values of the syntax elements of the first coefficient using the NNZ value as context.

7. The method of claim 6, wherein context-based coding the values of the syntax elements of the first coefficient comprises context-based coding, by a first coding engine of the image coding unit, the values of the syntax elements of the first coefficient, the method further comprising:
for each subsequent coefficient of the plurality of coefficients:
context-based coding, by a subsequent coding engine of the image coding unit, the values of the syntax elements of the subsequent coefficient using the updated NNZ value in parallel with context-based coding, by the first coding engine, the values of the syntax elements of the first coefficient.

8. The method of claim 1, wherein the block comprises the plurality of coefficients and one or more other coefficients, the method further comprising:
determining, by the image coding unit, the plurality of coefficients using the LNZ syntax element.

9. The method of claim 8, wherein determining the plurality of coefficients comprises:
determining that each coefficient of the plurality of coefficients occurs in a scan order for the block no later than a last non-zero coefficient of the block indicated by the LNZ syntax element.

10. The method of claim 1, wherein the LNZ syntax element is a LNZ low syntax element, wherein the plurality of coefficients is a plurality of low coefficients for the block, and wherein the contexts are low contexts, the method further comprising:
determining, by the image coding unit, an indication of a LNZ high syntax element for the block;
determining, by the image coding unit, high contexts for coding coefficient map values for each coefficient of a plurality of high coefficients of the block using the LNZ high syntax element; and
context-based coding, by the image coding unit, the coefficient map values for each of the plurality of high coefficients in parallel using the respective high contexts.

11. The method of claim 1, wherein the LNZ syntax element is a first LNZ low syntax element, wherein the plurality of coefficients is a plurality of first low coefficients corresponding to coefficients in a top row of the block, and wherein the contexts are first low contexts, the method further comprising:
determining, by the image coding unit, an indication of a second LNZ low syntax element for the block;
determining, by the image coding unit, second low contexts for coding coefficient map values for each coefficient of a plurality of second low coefficients corresponding to coefficients along a left edge of the block using the second LNZ low syntax element; and
context-based coding, by the image coding unit, the coefficient map values for each of the plurality of second low coefficients in parallel using the respective second low contexts.

12. The method of claim 1, wherein context-based coding the coefficient map values comprises encoding the coefficient map values.

13. The method of claim 1, wherein determining the indication of the LNZ syntax element comprises receiving the LNZ syntax element; and
wherein context-based coding the coefficient map values comprises decoding the coefficient map values.

14. A device comprising:
a memory configured to store image data; and
an image coding unit implemented in circuitry, the image coding unit being configured to:
determine an indication of a last-non-zero (LNZ) syntax element for a block of image data;
determine contexts for coding a coefficient map value for each coefficient of a plurality of coefficients of the block using the LNZ syntax element, wherein the coefficient map value for each coefficient of the plurality of coefficients indicates whether a respective coefficient of the plurality of coefficients is coded or not coded; and
context-based code the coefficient map value for each of the plurality of coefficients in parallel using the respective contexts.

15. The device of claim 14, wherein the image coding unit comprises a first coding engine and a second coding engine and wherein, to context-based code:
the first coding engine is configured to context-based code a coefficient map value for a first coefficient of the plurality of coefficients in parallel with context-based coding, by the second coding engine, a coefficient map value for a second coefficient of the plurality of coefficients.

16. The device of claim 14, wherein the image coding unit is further configured to:
calculate using the coefficient map values, a number of non-zero coefficients (NNZ) value as context for coding values of syntax elements of a first coefficient of the plurality of coefficients; and
for each subsequent coefficient of the plurality of coefficients:
update the NNZ value; and
use the updated NNZ value as context for coding values of syntax elements of the subsequent coefficient.

17. The device of claim 16, wherein, to calculate the first NNZ value, the image coding unit is configured to calculate a sum of the coefficient map values.

18. The device of claim 16, wherein, to update the NNZ value, the image coding unit is configured to subtract a coefficient map value for a previous coefficient from the NNZ value.

19. The device of claim 16, wherein the image coding unit is further configured to context-based code the values of the syntax elements of the first coefficient using the NNZ value as context.

20. The device of claim 19, wherein the image coding unit comprises a first coding engine and one or more subsequent coding engines and wherein to context-based code the values of the syntax elements of the first coefficient, the first coding engine is configured to context-based code the values of the syntax elements of the first coefficient, and wherein the one or more subsequent coding engines are configured to:

for each subsequent coefficient of the plurality of coefficients:
context-based code the values of the syntax elements of the subsequent coefficient using the updated NNZ value in parallel with context-based coding, by the first coding engine, the values of the syntax elements of the first coefficient.

21. The device of claim 14, wherein the block comprises the plurality of coefficients and one or more other coefficients and wherein the image coding unit is configured to:
determine the plurality of coefficients using the LNZ syntax element.

22. The device of claim 21, wherein, to determine the plurality of coefficients, the image coding unit is configured to:
determine that each coefficient of the plurality of coefficients occurs in a scan order for the block no later than a last non-zero coefficient of the block indicated by the LNZ syntax element.

23. The device of claim 14, wherein the LNZ syntax element is a LNZ low syntax element, wherein the plurality of coefficients is a plurality of low coefficients for the block, wherein the contexts are low contexts, and wherein the image coding unit is configured to:
determine an indication of a LNZ high syntax element for the block;
determine high contexts for coding coefficient map values for each coefficient of a plurality of high coefficients of the block using the LNZ high syntax element; and
context-based code the coefficient map values for each of the plurality of high coefficients in parallel using the respective high contexts.

24. The device of claim 14, wherein the LNZ syntax element is a first LNZ low syntax element, wherein the plurality of coefficients is a plurality of first low coefficients corresponding to coefficients in a top row of the block, wherein the contexts are first low contexts, and wherein the image coding unit is configured to:
determine an indication of a second LNZ low syntax element for the block;
determine second low contexts for coding coefficient map values for each coefficient of a plurality of second low coefficients corresponding to coefficients along a left edge of the block using the second LNZ low syntax element; and
context-based code the coefficient map values for each of the plurality of second low coefficients in parallel using the respective second low contexts.

25. The device of claim 14, wherein, to context-based code the coefficient map values, the image coding unit is configured to encode the coefficient map values.

26. The device of claim 14,
wherein, to determine the indication of the LNZ syntax element, the image coding unit is configured to receive the LNZ syntax element; and
wherein, to context-based code the coefficient map values, the image coding unit is configured to decode the coefficient map values.

27. A non-transitory computer-readable storage medium comprising instructions that, when executed, cause a processor to:
determine an indication of a last-non-zero (LNZ) syntax element for a block of image data;
determine contexts for coding a coefficient map value for each coefficient of a plurality of coefficients of the block using the LNZ syntax element, wherein the coefficient map value for each coefficient of the plurality of coefficients indicates whether a respective coefficient of the plurality of coefficients is coded or not coded; and
context-based code the coefficient map value for each of the plurality of coefficients in parallel using the respective contexts.

* * * * *